US012478810B2

(12) United States Patent
Selim et al.

(10) Patent No.: US 12,478,810 B2
(45) Date of Patent: Nov. 25, 2025

(54) FALL RESTRAINT APPARATUS FOR A GRID FRAMEWORK STRUCTURE

(71) Applicant: Ocado Innovation Limited, Hatfield (GB)

(72) Inventors: Andrew Selim, Hatfield (GB); Andrew Geake, Hatfield (GB); Dean Shields, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 23 days.

(21) Appl. No.: 18/547,394

(22) PCT Filed: Feb. 22, 2022

(86) PCT No.: PCT/EP2022/054452

§ 371 (c)(1),
(2) Date: Aug. 22, 2023

(87) PCT Pub. No.: WO2022/175561

PCT Pub. Date: Aug. 25, 2022

(65) Prior Publication Data

US 2024/0316374 A1 Sep. 26, 2024

(30) Foreign Application Priority Data

Feb. 22, 2021 (GB) ...................................... 2102508
Mar. 5, 2021 (GB) ...................................... 2103124
Aug. 16, 2021 (GB) ...................................... 2111707

(51) Int. Cl.
*A62B 35/00* (2006.01)
*B65G 1/04* (2006.01)

(52) U.S. Cl.
CPC ........ *A62B 35/0068* (2013.01); *B65G 1/0464* (2013.01)

(58) Field of Classification Search
CPC ........ A61H 3/04; A61H 3/008; B65G 1/0464; A62B 35/0062; A62B 35/0081; A62B 35/0068
See application file for complete search history.

(56) References Cited

U.S. PATENT DOCUMENTS 2,459,066 A 1/1949 Sam
2,833,332 A * 5/1958 Nabors .................... A61H 3/04
482/67

(Continued)

FOREIGN PATENT DOCUMENTS

CN 210530178 U 5/2020
FR 2865932 A1 8/2005

(Continued)

OTHER PUBLICATIONS

Office Action (Examination Report No. 1) issued on Sep. 23, 2024, by the Australian Patent Office in corresponding Australian Patent Application No. 2022222333. (4 pages).

(Continued)

*Primary Examiner* — Bradley Duckworth
(74) *Attorney, Agent, or Firm* — Buchanan Ingersoll & Rooney PC

(57) ABSTRACT

A fall restraint device for moving on a grid structure including a plurality of grid cells each having a length in a range 600-800 mm and a width in a range 400-600 mm, so defining a grid opening defined by a pair of adjacent tracks of a first set of parallel tracks and a pair of adjacent tracks of a second set of parallel tracks. The fall restraint device includes a frame having an upper portion configured for restraining at least one operative, a moving assembly mounted to a lower portion of the frame, the moving assembly being configured for moving the frame on the grid structure; wherein the frame has a weight less than 100 kg such that the moving assembly will be manually lifted clear (Continued)

of the grid structure by the at least one operative restrained to the upper portion of the frame.

20 Claims, 18 Drawing Sheets

(56) References Cited

U.S. PATENT DOCUMENTS

| | | | | |
|---|---|---|---|---|
| 2,989,114 | A * | 6/1961 | Ecroyd | A61H 3/00 135/84 |
| 3,273,888 | A * | 9/1966 | Burns | A61H 3/04 482/67 |
| 3,778,052 | A * | 12/1973 | Andow | A61H 3/04 482/67 |
| 5,174,590 | A * | 12/1992 | Kerley | A61H 3/04 280/87.051 |
| 5,224,506 | A * | 7/1993 | Allen | A61H 3/04 16/42 T |
| 5,476,432 | A * | 12/1995 | Dickens | A61H 3/04 482/67 |
| 5,526,893 | A * | 6/1996 | Higer | A61H 3/04 482/68 |
| 5,711,397 | A | 1/1998 | Flora et al. | |
| 6,539,562 | B1 * | 4/2003 | Bianca | A61H 3/04 482/69 |
| 6,733,018 | B2 * | 5/2004 | Razon | A61H 3/04 280/87.021 |
| 6,742,523 | B2 * | 6/2004 | Dubats | A61H 3/008 482/68 |
| 6,935,353 | B2 * | 8/2005 | Hawkes | A61H 3/008 482/69 |
| 7,032,710 | B2 * | 4/2006 | Anderson | A62B 35/0068 182/16 |
| 7,494,139 | B2 * | 2/2009 | Turner | A61H 3/04 280/87.041 |
| 7,828,116 | B2 * | 11/2010 | Vetesnik | E06C 7/18 182/115 |
| 8,641,050 | B2 * | 2/2014 | Gardner | A61G 5/061 280/5.2 |
| 10,836,577 | B2 * | 11/2020 | Fryer | B65G 45/10 |
| 11,383,926 | B2 * | 7/2022 | Austrheim | B65G 1/0485 |
| 11,452,892 | B2 * | 9/2022 | Kelly | A62B 35/0068 |
| 11,484,736 | B2 * | 11/2022 | Austrheim | B66F 9/063 |
| 2002/0056590 | A1 | 5/2002 | Goldie et al. | |
| 2002/0119866 | A1 * | 8/2002 | Aube | A61H 3/00 482/41 |
| 2006/0163186 | A1 | 7/2006 | Choate et al. | |
| 2008/0053946 | A1 | 3/2008 | Choate et al. | |
| 2013/0226046 | A1 * | 8/2013 | Salazar | A61H 3/008 601/23 |
| 2019/0060731 | A1 | 2/2019 | Grimes | |
| 2019/0321251 | A1 | 10/2019 | Chen et al. | |
| 2021/0162290 | A1 * | 6/2021 | Benson | A61H 3/04 |

FOREIGN PATENT DOCUMENTS

| | | | |
|---|---|---|---|
| KR | 20200039220 | A | 4/2020 |
| WO | 0124972 | A2 | 4/2001 |
| WO | 2008145669 | A1 | 12/2008 |
| WO | 2015019055 | A1 | 2/2015 |
| WO | 2015140216 | A1 | 9/2015 |
| WO | 2015185628 | A2 | 12/2015 |
| WO | 2018146304 | A1 | 8/2018 |
| WO | 2019233749 | A1 | 12/2019 |
| WO | 2020151866 | A1 | 7/2020 |

OTHER PUBLICATIONS

International Search Report (PCT/ISA/210) and Written Opinion (PCT/ISA/237) mailed on May 27, 2022, by the European Patent Office as the International Searching Authority for International Application No. PCT/EP2022/054452. (17 pages).

Patents Act 1977: Combined Search and Examination Report under Sections 17 and 18(3) dated Aug. 19, 2022, issued by the United Kingdom Intellectual Property Office in corresponding Great Britain Application No. GB2202409.5. (6 pages).

Patents Act 1977: Search Report under Section 17 dated Aug. 25, 2021, issued by the United Kingdom Intellectual Property Office in corresponding Great Britain Application No. GB2103124.0. (3 pages).

Office Action issued on Nov. 30, 2024, by the Korean Patent Office in corresponding Korean Patent Application No. 10-2023-7032716, and an English Translation of the Office Action. (28 pages).

* cited by examiner

FALL RESTRAINT APPARATUS FOR A GRID FRAMEWORK STRUCTURE

FIELD OF INVENTION

The present invention relates to the field of remotely operated load handling devices on tracks located on a grid framework structure for handling storage containers or bins stacked in the grid framework structure, more specifically to a fall restraint apparatus for use on a grid framework structure.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices remotely operative on tracks located on the top of the grid framework structure. A system of this type is illustrated schematically in FIGS. 1 to 3 of the accompanying drawings.

As shown in FIGS. 1 and 2, stackable containers, known as bins or containers 10, are stacked on top of one another to form stacks 12. The stacks 12 are arranged in a grid framework structure 14 in a warehousing or manufacturing environment. The grid framework is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The grid framework structure 14 comprises a plurality of upright members or upright columns 16 that support horizontal members 18, 20. A first set of parallel horizontal grid members 18 is arranged perpendicularly to a second set of parallel horizontal grid members 20 and arranged in a grid pattern to form a grid structure 14*b* comprising a plurality of grid cells lying in a horizontal plane. The grid structure is supported by the upright members 16. The members 16, 18, 20 are typically manufactured from metal and typically welded or bolted together or a combination of both. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 includes rails or tracks 22*a*, 22*b* arranged in a grid pattern across the top of the stacks 12. Referring additionally to FIGS. 2 and 3, the rails 22 support a plurality of load handling devices 30. A first set 22*a* of parallel rails or tracks guide movement of the robotic load handling devices 30 in a first direction (for example, an X-direction) across the top of the grid framework structure 14, and a second set 22*b* of parallel rails or tracks, arranged perpendicular to the first set 22*a*, guide movement of the load handling devices 30 in a second direction (for example, a Y-direction), perpendicular to the first direction. In this way, the rails or tracks 22*a*, 22*b* allow movement of the robotic load handling devices 30 laterally in two dimensions in the horizontal X-Y plane, so that a load handling device 30 can be moved into position above any of the stacks 12. There are numerous ways in the art to provide tracks in the grid structure. One arrangement involves separately mounting the tracks to a track support. This involves laying the track supports in a grid-like pattern and then, subsequently mounting or fixing the tracks to the track supports such that the tracks adopt the grid-like pattern of the track supports. In an alternative and equally plausible arrangement of the grid members of the grid structure and as taught in WO18146304 (Autostore) is to integrate or combine the tracks into the track support to define the grid members. Thus, the grid structure comprises an arrangement of the grid members into a grid pattern comprising a plurality of grid cells or grid spaces. In both methods of the laying the tracks, the grid structure comprises a plurality of grid cells or grid spaces. Referring to FIG. 2, the grid cells or spaces are in the form of a plurality of substantially rectangular frames in the horizontal plane, each rectangular frame constituting a grid cell that is suitable for accommodating a correspondingly shaped container or tote. Based on the Cartesian coordinates shown in FIG. 2, typically the dimensions of the grid cell is in the range 600 mm to 800 mm in the X direction and 400 mm-600 mm in the direction that is suitable to allow a container or tote of a smaller dimension to pass through a grid cell. For example, a typical tote is 653 mm long and 543 mm wide and is able to pass through a grid opening of about 761 mm by 561 mm.

A known load handling device 30 shown in FIGS. 4 and 5 comprises a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting a pair of wheels on the front of the vehicle body 32 and a pair of wheels 34 on the back of the vehicle 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction. Each of the set wheels are driven to enable movement of the vehicle in X and Y directions respectively along the rails. One or both sets of wheels can be moved vertically to lift each set of wheels clear of the respective rails, thereby allowing the vehicle to move in the desired direction.

The load handling device 30 is equipped with a lifting device or crane mechanism to lift a storage container from above. The crane mechanism comprises a winch tether or cable 38 wound on a spool or reel (not shown) and a grabber device 39. The lifting device comprises a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess 40, in the lower part. The recess is sized to accommodate the container 10 when it is lifted by the crane mechanism, as shown in FIGS. 5 (*a* and *b*). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device.

In certain occasions it is necessary for a personal to enter the grid structure and perform necessary operations on the grid structure. These operations include servicing or retrieval of a faulty robotic load handling device on the grid structure, inspecting the condition of the grid structure and/or attending to spillages or a build-up of dirt or duct on the grid structure which requires attention. A number of automated service vehicles exist in the art to facilitate a personal to enter the grid structure.

WO 2015/140216 (Ocado Innovation Ltd) teaches a robotic service device comprising a releasable docking mechanism to enable it to dock and latch on to malfunctioning load handling devices. The service device may also be provided with cleaning means and camera means to enable the condition of the grid and other robotic devices to be monitored.

WO2019233749 (Autostore Technology AS) teaches a service vehicle wherein the service vehicle comprises propulsion means allowing movement of the service vehicle across the rail system and a fire extinguisher compartment for containing firefighting equipment, the propulsion means comprises a caterpillar track configured to drive on top of the rail system, wherein the caterpillar track has a length Lpm at the level of the horizontal plane exceeding a length corresponding to a diagonal length across a maximum grid opening of the rail system when the service vehicle is moving across the rail system.

WO2020151866 (Autostore Technology AS) teaches a service vehicle comprising a displacement mechanism and a hoist arrangement connected to the displacement mechanism, wherein the displacement mechanism and the hoist arrangement are configured for moving the container handling vehicle between an operational position on the rail system and a loaded position within the container handling vehicle part.

A problem associated with automated service vehicles taught in the art is that the service vehicle would need to be permanently operational on the grid structure or at least on permanent standby on the grid structure and if not on the grid structure, would require to be hoisted to lift the service vehicle and place the service vehicle on the grid structure should there be a need to perform a necessary operation. Thus, in an event of an incident or to perform a necessary operation on the grid structure, the service vehicle can then be available to travel on the tracks to the location of the incident.

Individual containers are stacked in vertical layers, their locations in the grid framework structure or "hive" may be indicated using co-ordinates in three dimensions to represent the load handling device or a container's position and a container depth (e.g. container at (X, Y, Z), depth W). Equally, locations in the grid framework structure may be indicated in two dimensions to represent the load handling device or a container's position and a container depth (e.g. container depth (e.g. container at (X, Y), depth Z). For example, Z=1 identifies the uppermost layer of the grid, i.e. the layer immediately below the rail system, Z=2 is the second layer below the rail system and so on to the lowermost, bottom layer of the grid. The modular frames can be stacked on top of each other to increase the height of the grid framework structure and thus, increase the depth Z value, and thereby, allowing containers stacked vertically to extend through one or more modular frames.

As the grid framework structure gets larger supporting an increasing number of robotic load handling devices, there has been an increasing need to access the grid structure. The increasing need to access the grid structure increases the likelihood that a personal may get injured on the grid structure and in a worst case scenario, may fall through a grid cell. The height of the grid framework structure can be in excess of 21 containers high, so the risk of serious injury from a fall becomes high. As a result, there has been a drive to improve not only the safety of personal when operating on the grid structure but to provide a system whereby an injured personal can be recovered from the grid structure quickly. Industrial safety bodies have been lobbying for a system to allow a personal to safely access the grid structure as well as having the ability to recover an injured personal on the grid structure to the extent that such safety systems are a regularity requirement. Whilst service vehicles discussed above are known that are able to recover an injured personal from the grid structure, the service vehicle must either have a permanent home on the grid structure and therefore, occupies a grid cell or the service vehicle must be hoisted onto the grid structure which not only increases downtime when the grid structure becomes non-operational but adds a layer of delay to recovering an injured personal on the grid structure.

A fall restraint system is thus required that is able to be operated safely on the grid structure and be made launched on the grid structure quickly.

This application claims priority from GB application number 2102508.5 filed 22 Feb. 2021, GB application number 2103124.0 filed 5 Mar. 2021 and GB application number 2111707.2 filed on 16 Aug. 2021, the contents being herein incorporated by reference.

SUMMARY OF INVENTION

The applicant has mitigated the above problem by providing a fall restraint apparatus that is portable and manually operated so as to be able to be lifted by an operator. More specifically, the present invention provides a fall restraint apparatus for manually moving on a grid structure comprising a first set of parallel tracks and a second set of parallel tracks running transversely to the first set in a substantially horizontal plane and arranged in a grid pattern comprising a plurality of grid cells, each grid cell having a length in the range 600-800 mm and a width in the range 400-600 mm so defining a grid opening defined by a pair of adjacent tracks of the first set of parallel tracks and a pair of adjacent tracks of the second set of parallel tracks; the fall restraint apparatus comprising:

- a frame having an upper portion and a lower portion, the upper portion being configured for restraining at least one operative,
- a moving assembly mounted to the lower portion of the frame, the moving assembly being configured for moving the frame on the grid structure; wherein the frame has a weight less than 100 kg such that at least a portion of the moving assembly is able to be manually lifted clear of the grid structure by the at least one operative restrained to the upper portion of the frame.

The fall restraint system of the present invention operates in the field of a storage system comprising a grid framework structure. The grid framework structure comprises a first set of parallel tracks and a second set of parallel tracks running transversely to the first set in a substantially horizontal plane and arranged in a grid pattern comprising a plurality of grid cells. The grid structure is supported by a plurality of vertical columns at one or more intersections of the first and second set of parallel tracks. The storage system stores a plurality of stacks of storage containers arranged in storage columns below the grid structure. A load handling device operative on the grid structure is able to lift a storage container guided by the vertical columns supporting the grid structure above the tracks. Each grid cell has a length in the range 600-800 mm and a width in the range 400-600 mm so defining a grid opening defined by a pair of adjacent tracks of the first set of parallel tracks and a pair of adjacent tracks of the second set of parallel tracks.

Preferably, the weight of the fall restraint apparatus is less than 100 kg. By providing a light weight fall restraint apparatus having a weight less than 100 kg, allows the fall restraint apparatus of the present invention to be lifted by at least one operator. This not only allows the fall restraint apparatus to be launched on the grid structure should there be a need for a rapid response to an incident on the grid structure but the light weight of the fall restraint apparatus allows an operator to easily manoeuvre the fall restraint apparatus in multiple directions on the grid structure simply by lifting the fall restraint apparatus embodying the frame so that at least a portion of the rolling assembly is lifted clear of the grid structure below. This allows the fall restraint apparatus to be rotated to a desired orientation on the grid structure, i.e. pointed in the direction of the incident. To provide a light weight fall restraint apparatus, the weight of the frame alone is less than 100 kg. Preferably, the weight of the frame is less than 60 kg. More preferably, the weight of the frame is less than 30 kg. Having a lightweight frame with a weight less than 100 kg results in a lightweight fall restraint apparatus such that at least a portion of rolling assembly can be lifted clear of the tracks.

To provide a light weight fall restraint apparatus, preferably, the frame comprises an assembly of frame members arranged to form an interior open structure for accommodating at least one operative such that the at least one operative restrained by the upper portion is able to manually walk on the grid structure within the open interior space. For example, the frame members can be lightweight aluminium tubular members or other lightweight frame members including but not limited to plastic materials or fibre composite material. To enable the fall restraint apparatus to lift a load e.g. an injured person on the tracks or a person fallen down a grid opening or generally a load on the tracks, preferably, the upper portion of the frame comprises a suspension frame member or suspension beam for supporting at least one operative or a load on the tracks. The term “suspension frame member” and “suspension beam” are used interchangeably throughout the patent specification to mean the same feature. Similarly, the terms “open interior space” and “open interior structure” are used interchangeably throughout the patent specification to mean the same feature.

Preferably, the upper portion comprises a pair of parallel side frame members, said parallel side frame members are connected together by at least one end frame member substantially perpendicular to the parallel side frame members to define a handle, said handle is supported above the wheel assembly by a plurality of supports or down tubes such that at least one operative restrained to the upper portion of the frame is able to manually hold onto the handle whilst walking on the grid structure. The frame members can be assembled in “Zimmer®” type configuration to allow an operative to be supported by the frame by holding onto the handle whilst walking on the grid structure.

To provide structural integrity to the frame whilst restraining the at least one operative to the upper portion of the frame, preferably, the plurality of frame members comprises at least one bracing member. For example, the bracing member can be a horizontal bracing member connecting parallel frame members or a diagonal bracing member. More preferably, the upper portion of the frame comprises an assembly of H-frames. Optionally, the upper portion of the frame comprises A-frames and a suspension beam extending between the A-frames for supporting at least one operative to the suspension beam to define a gantry.

Preferably, the moving assembly comprises a rolling and/or sliding assembly. The moving assembly allows the frame to be easily manoeuvred on the grid structure. To improve the stability of the fall restraint apparatus on the grid structure and allow an operative restrained by the upper portion of the frame to steer or move the fall restraint apparatus in any direction on the grid structure without any portion of the rolling assembly falling into a grid opening, the rolling assembly comprises a front wheel assembly and a rear wheel assembly, each wheel assembly of the front wheel assembly and the rear wheel assembly extends across the at least one grid cell or grid opening such that each wheel assembly of the front wheel assembly and the rear wheel assembly contacts different tracks of the grid structure. The rolling assembling is freewheeling so as to allow an operative restrained to the upper portion of the frame to manually move the fall restraint apparatus on the grid structure, i.e. manually push the fall restraint apparatus on the grid structure.

By configuring the rolling assembly to comprise a front wheel assembly and rear wheel assembly, each wheel assembly having a length such that each wheel assembly of the front wheel assembly and the rear wheel assembly contacts different tracks of the grid structure prevents the wheel assembly from falling into a grid opening, particularly when steering the fall restraint apparatus on the grid structure. For the purpose of the present invention, the wheel assembly contacts different tracks of the grid structure is construed to mean that there are at least two points of contact between the wheel assembly and the tracks. The at least two points of the contact are not on the same track but on different tracks so that at least a portion of the wheel assembly is prevented from dropping into a grid opening. The different tracks could be parallel tracks such that each portion of the wheel assembly is in contact with each of the parallel tracks or in contact with diagonally opposing tracks. Another way of describing the contact between the wheel assembly of the front wheel assembly and the rear wheel assembly is that each wheel assembly of the front wheel assembly and the rear wheel assembly contacts at least two different areas of the grid structure.

Preferably, the length of each wheel assembly of the front and rear assembly has a length greater than the length across at least one grid cell, more preferably greater than the length across at least one grid opening. To enable the fall restraint apparatus to be picked up and re-positioned on the grid structure so as to be orientated in any direction on the tracks, preferably, the length of each wheel assembly of the front and rear wheel assembly is greater than the length corresponding to the diagonal length across a grid opening. The diagonal length represents the maximum diagonal length across a grid opening taking the grid opening as having a rectangular or square shape. By have a wheel assembly that is longer than the diagonal length across a grid cell, prevents at least a portion of the rolling assembly from falling into a grid opening when the fall restraint apparatus is positioned diagonally of the first and the second set of parallel tracks.

To increase the contact surface area between the grid structure and the wheel assembly so as to allow the fall restraint apparatus to be rotated in any direction on the grid structure, preferably each wheel assembly of front wheel assembly and/or the rear wheel assembly comprises at least one elongated roller, e.g. at least one free rolling elongated roller. The elongated roller extends across the width of a track so as to allow the wheel assembly to extend outwardly of the upper portion of the frame and contact different points of the grid structure, thereby improving stability of the fall restraint apparatus on the grid structure. For example, a single elongated roller can be mounted to each of the front and rear of the fall restraint apparatus. The length of the single elongated roller can be greater than the distance across at least one grid cell such that when mounted to the frame, the width of the wheel assembly extends transversely to the longitudinal direction of the upper portion of the frame and beyond a grid cell to contact two different tracks of the grid structure.

Alternatively and to provide the same level of stability of a single elongated roller extending across at least one grid cell, optionally, each wheel assembly of the front and rear wheel assembly comprises a plurality of wheels, the plurality of wheels being arranged so as to be rotatable about a common axis and the plurality of wheels may be arranged to extend across at least one grid cell. The plurality of wheels can be a plurality of elongated rollers and the plurality of elongated rollers can be arranged so as to be rotatable about a common axis. One way of arranging a plurality of wheels so that the plurality of wheels are rotatable about a common axis is to mount the plurality of wheels to at least one shaft, otherwise termed a common shaft, whereby the shaft has a length greater than the distance across at least one grid cell such that the plurality of wheels contacts at least two different tracks of the grid structure.

Alternatively, the plurality of wheels can be mounted to a plurality of shafts, the plurality of shafts being arranged such that the plurality of wheels are rotatable about a common axis. To prevent at least one of the plurality of the wheels from falling into a grid opening, preferably, each wheel of the plurality of wheels is separated by a distance less than the width of a track of the first and second set of tracks. To further prevent at least a portion of the wheel assembly falling into a grid cell, preferably, the front wheel assembly is separated from the rear wheel assembly by a wheelbase having a length greater than the distance across at least one grid cell so that the rolling assembly contacts different tracks of the grid structure—in this case, front and rear tracks. More specifically, the wheel base extends across at least two grid cells or grid openings.

More preferably, the rolling assembly extends outwardly of the upper portion, i.e. the rolling assembly extends outwardly and laterally either side of the frame. For example, the width of the upper portion can be sized to correspond to the width of a grid cell and the wheel assembly extends outwardly of the upper portion beyond the width of the at least one grid cell to provide stability of the fall restraint apparatus on the grid structure. In other words, the footprint occupied by the rolling assembly is larger than the footprint occupied by the upper portion to provide increased stability of the fall restraint apparatus on the grid structure. Preferably, the wheel assembly of the front wheel assembly and the rear wheel assembly extends transversely to the longitudinal direction of the upper portion and having a width greater than the distance across at least one grid cell such that the fall restraint apparatus travels in the direction along the longitudinal direction of the upper portion. Preferably, the lower portion of the frame comprises a sub-frame for supporting the rolling assembly or wheel assembly. The sub-frame provides additional stability to the fall restraint apparatus and allows the fall restraint apparatus to extend over a greater area of the grid structure.

Preferably, the sliding assembly comprises a food safe material so that the sliding assembly may be used near to food products. Preferably, the sliding assembly comprises one or more skates or skis. The skates allow the fall restraint apparatus to slide over the grid structure and allow easier turning and manoeuvring on the grid structure. More preferably, the one or more skates extend longitudinally along the length of the frame. By arranging the skates longitudinally along the length of the frame, contact between the frame and the grid structure is increased, thereby increasing the stability of the fall restraint apparatus. Alternatively, the sliding assembly may comprise a low friction coating on one or more lower portion frame members. Optionally, the one or more skates diverge outwardly from a front end of the frame towards an opposing rear end of the frame. Preferably, the one or more skates diverges outwardly from the front end of the frame by an acute angle.

To restrain at least one operative to the upper portion of the frame, the fall restraint apparatus further comprises at least one carabiner or shackle. The carabiner can be coupled to the upper portion of the frame and allows an operative wearing a harness to be restrained by the upper portion by the carabiner coupled to the upper portion of the frame.

To prevent an operative restrained to the upper portion of the frame from fall too far into a grid opening and thereby, causing injury, preferably the fall restraint apparatus comprises a fall arrest inertia reel coupled to the upper portion of the frame. Thus, should an operative harnessed to the fall arrest inertia reel slip into a grid opening, the inertia reel restraining the operative to the upper portion of the frame would prevent the operative from falling too deep into the grid cell through the locking action of the inertia reel. To retrieve an injured personal on the grid structure or who has fallen down a grid cell, preferably, the fall restraint apparatus comprises a winch coupled to the upper portion of the frame. The winch can be a manual winch or a motorised assisted winch so as to lift a person that has fallen through a grid cell. The upper portion of the frame comprises a suspension frame member or suspension beam extending across the pair of parallel side bars for supporting at least one operative. The suspension beam can be removeably attached to the pair of parallel side bars. A winch assembly can coupled to the suspension beam to provide support when winching a person that has fallen down a grid cell.

The fall restrain apparatus of the present invention can also be used to retrieve a malfunctioned load handling device on the tracks. For example, the winch can be used to upright a toppled load handling device on the tracks. Whilst the winch may be sufficient to winch an injured personal which can weigh up to 100 kg, the winch assembly may not be sufficiently strong to winch a malfunctioned load handling device, which can weight in excess of 150 kg, clear of the tracks and carry the load handling device to the edge of the grid structure without compromising the stability of the fall restraint apparatus on the grid structure. This is particularly the case where the fall restraint apparatus is manually driven by an operative restrained to the upper portion of the frame. Additionally, there may insufficient headroom to lift the load handling device clear off the tracks. For example, there may be little headroom above the grid structure to accommodate a tall winch assembly sufficient to lift a load handling device clear of the tracks. Typically, a storage system comprising the grid framework structure is housed in a distribution centre. To maximise the use of space in the distribution and thus, storage of items, the height of the grid framework structure is made large as possible so that the grid framework structure extends close to the ceiling of the distribution leaving little headroom above the tracks besides the load handling device operative on the tracks. This removes the ability of a tall apparatus comprising a winch assembly from operating on the grid structure. This makes it difficult to lift a malfunctioned load handling device on the grid structure and move it to the edge of the grid structure. Moreover, the taller the service vehicle accommodating the winch assembly, the more unstable the service vehicle being on the grid structure as the centre of gravity becomes too high that any slight swinging of the load handling device suspended from the winch assembly may cause the service vehicle to topple on the grid structure. To try and mitigate this instability, it may be necessary to increase the footprint of the base of the service vehicle across multiple grid cells and thereby, occupy more grid cells or alternatively, concentrate the weight of the service vehicle towards the base of the service vehicle. Thus, it would be necessary to isolate a greater portion of the grid structure to recover a single load handling device.

To mitigate this problem, preferably the frame further comprising a tow member for coupling or interfacing with a load handling device on the grid structure. More preferably, the tow member is a tow bar having one end coupled to the upper portion of the frame and the other end for coupling or interfacing with a load handling device. To retrieve a malfunctioned load handling device stranded on the tracks, the fall restraint apparatus further comprises a tow bar that can couple onto the load handling device, e.g. interface with a hoist element at the top of the load handling device that is used to hoist the load handling device, and either push or pull the malfunctioned load handling device to the edge of the grid structure. The wheel motors can be dis-engaged so allowing the load handling device to be pushed or pulled by human power alone removing the need to winch the load handling device clear of the track as found in prior art service vehicles.

Preferably, the frame comprises one or more anti-topple mechanisms either side of the frame for preventing toppling of the fall restraint apparatus on the grid structure, said one or more anti-topple mechanisms comprising a continuous stabilising surface extending between the front and rear wheel assemblies. The one or more anti-topple mechanisms are configured to rest on the grid members if the front and/or rear wheel assembly is not in contact with a grid member and the fall restraint apparatus becomes unbalanced and starts to fall into a grid opening. Thus, the anti-topple mechanisms act as stabilisers preventing the fall restraint apparatus from leaning substantially to one side and ensuring that the fall restraint apparatus remains substantially vertical. In particular, the stabilising surface is continuous to ensure that it can touch a grid member at any point between the front and rear wheel assemblies when and if the fall restraint apparatus becomes unstable and starts to topple towards the grid structure. Preferably, the continuous stabilising surface comprises one or more tethers tensioned between the front and rear wheel assemblies. The tethers or cables may comprise stainless steel. An advantage of using tethers or cables is that they are lightweight so an operative is still able to lift the whole fall restraint apparatus.

The frame may have a variety of shapes and relative dimensions. Preferably, the frame has a front end and an opposing rear end, the opposing rear end being wider than the front end and having an opening such that a second fall restraint apparatus can be nested within the fall restraint apparatus. This particular configuration allows multiple fall restraint apparatuses to be stored in a small area by nesting one fall restraint apparatus in another. Preferably, the frame is wedge-shaped to allow for more efficient packing of the fall restraint apparatuses.

Preferably, the height of the fall restraint apparatus is less than 2 m. The height of the fall restraint apparatus may be 1.9 m, 1.8 m, 1.7 m or 1.6 m. More preferably, the height of the fall restraint apparatus is less than 1.5 m to allow the fall restraint apparatus to be used under a low ceiling height. The height of the fall restraint apparatus may be 1.4 m, 1.3 m, 1.2 m or 1.1 m.

The fall restraint apparatus can be attached to another fall restraint apparatus to form an assembly. The assembly may comprise a first fall restraint apparatus, a second fall restraint apparatus, a suspension beam or suspension frame member joining the first and second fall restraint apparatus together, wherein each of the first and second fall restraint apparatus comprises a fall restraint apparatus of the present invention. The suspension beam may be detachable and may be attached to the first and second fall restraint apparatuses when in the desired location on the grid structure, or alternatively it may be attached while off the grid. The separation between the first and second fall restraint apparatus by the suspension beam additionally provides a workspace for an operative to be restrained to the suspension beam.

For example, the operative may be attached to the suspension beam by a carabiner to enable grid repair work to be carried out. The suspension beam or suspension frame member may be mounted to an upper portion of the frame of the first and second fall restraint apparatus. By having the suspension beam mounted on an upper portion of the frame of the first and second fall restraint apparatus, there is more clearance (vertical space) available for an operative to carry out various activities on the grid structure. For example, it is possible for an operative to be coupled to the suspension beam by a fall arrest inertia reel in order to rescue a personal from the grid structure. Further, it is possible to attach a stretcher to the suspension beam. Preferably, a winch is mounted to the suspension beam or the suspension frame member. This advantageously allows a load handling device, or an injured personal to be lifted from the grid structure. Preferably, the suspension beam or suspension frame member is mounted to the upper portion of the first and/or second fall restraint apparatus by at least one pivotable joint. This advantageously allows each fall restraint apparatus to move independently of the other fall restraint apparatus on the tracks whilst still being linked together.

BRIEF DESCRIPTION OF THE DRAWINGS

Further features and aspects of the present invention will be apparent from the following detailed description of an illustrative embodiment made with reference to the drawings, in which.

DETAILED DESCRIPTION

It is against the known features of the storage system such as the grid framework structure and the load handling device described above with reference to FIGS. 1 to 5, the present invention has been devised. To enable to access the grid structure and travel on the tracks, it is paramount that any service vehicle devised is able to travel over the grid cells without any one of the wheels of the service vehicle entering or dropping into a grid cell. Various techniques in the art, discussed above, exist to allow a service vehicle to travel over the top of the grid structure. The easiest way would be to adopt a wheel assembly of a typical load handling device that is operative on the grid structure and a drive mechanism for driving the wheels, i.e. comprising a first set of wheels for engaging with the tracks extending in the X direction and a second set of wheels for engaging with the tracks extending in the Y direction. Such a wheel assembly is taught in the art, WO 2015/140216 (Ocado Innovation Ltd) and WO2020/151866 (Autostore Technology AS), and are discussed above. However, such an arrangement of wheels limits the service vehicle to travelling in either an X direction or in a Y direction on the grid structure. Therefore, to negotiate around obstacles or other load handling devices on the grid structure, the service vehicle must travel in either the X direction and/or Y direction in order to reach a location or desired destination on the grid structure. In a majority of cases, a route is planned comprising movements in the X and Y direction in order to reach the desired location on the grid structure. This not only represents a longer length of travel to reach the desired location on the grid structure but is time consuming.

In an attempt to reduce the travel distance to a desired location on the grid structure and not be limited by the tracks in the X direction and Y direction, WO2019/233749 (Autostore Technology AS), teaches the use of caterpillar tracks to straddle over the surface of the tracks, i.e. drive over the surface of the tracks. The caterpillar tracks are dimensioned to have a length that exceeds the length corresponding to the diagonal length across a maximum grid opening of the grid structure so as to be able to straddle or travel over the tracks without any portion of the caterpillar tracks falling into any of the openings of the grid cell. The caterpillar tracks comprises a longitudinal extending belt and is driven by a belt motor.

Figure 7:
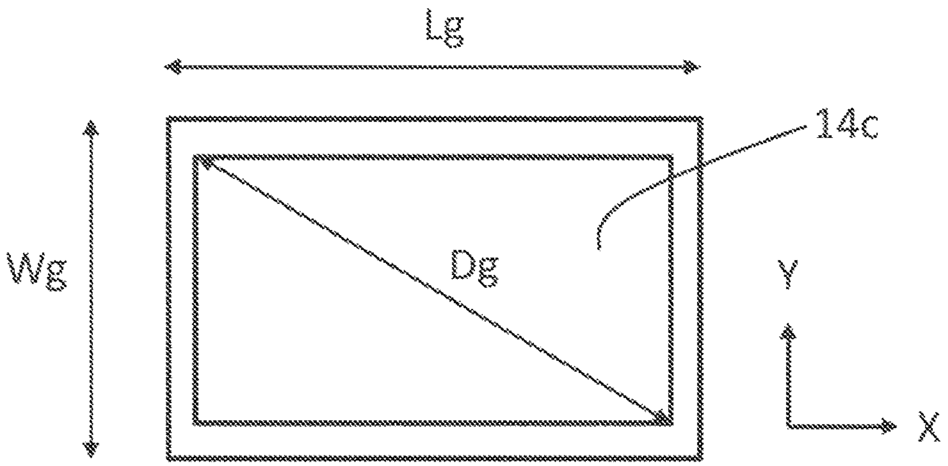
FIG. 7 is a schematic drawing of a top plan view of a cell showing the dimensions of the grid cell opening.

Referring to FIG. 7, the dimensions of a given grid cell is about 600-800 mm long and about 400-600 mm wide. The dimensions of the grid cell depends on the size of the containers or totes stored within the storage system and the ability of a load handling device operative on the grid structure to retrieve a storage container by lifting the storage container through a grid cell opening. This equates to a grid opening 14*c* having an area in the region of 3,600 $cm^2$ to 6,400 $cm^2$. Taking the width of a single track to be about 75 mm wide, and the longest length, Lg, of a given grid cell from the mid-point of a track to be about 760 mm long and the width, Wg, to be about 560 mm, this equates in a diagonal length, Dg, of about 944 mm and an area of a grid cell opening of about 4,256 $cm^2$. Other dimensions of the grid cell include a length of 654 mm along the longest length, Lg, and a width, Wg, of about 454 mm. In FIG. 7, the longest length of the grid cell is along the X direction and the width which is the shorter of the two lengths is along the Y direction. To prevent the wheels of the service vehicle from falling into an opening of a grid cell and thereby causing the service vehicle to become stranded on the grid structure or the very least cause damage the tracks, the length of the rolling assembly should be greater than the length across the diagonal length, Dg, across a grid opening 14*c* or at the very least the greater than the longest length, Lg, across at least one grid cell. Taking the example above, the maximum diagonal length, Dg, of a grid cell is about 944 mm and the longest length. Lg, is about 760 mm.

The length of the caterpillar tracks extends over several grid cells and thereby, allows the service vehicle to be steered in any direction on the grid structure. However, WO2019/233749 (Autostore Technology AS) requires the use of caterpillar tracks in order to travel on the tracks. The caterpillar tracks are heavy and require a motor to drive the belt which adds to the weight of the caterpillar tracks. Thus, any service vehicle comprising caterpillar tracks would not be portable and requires one or more motors to drive the belt removing its ability to be launched quickly onto the grid structure.

Figure 1:
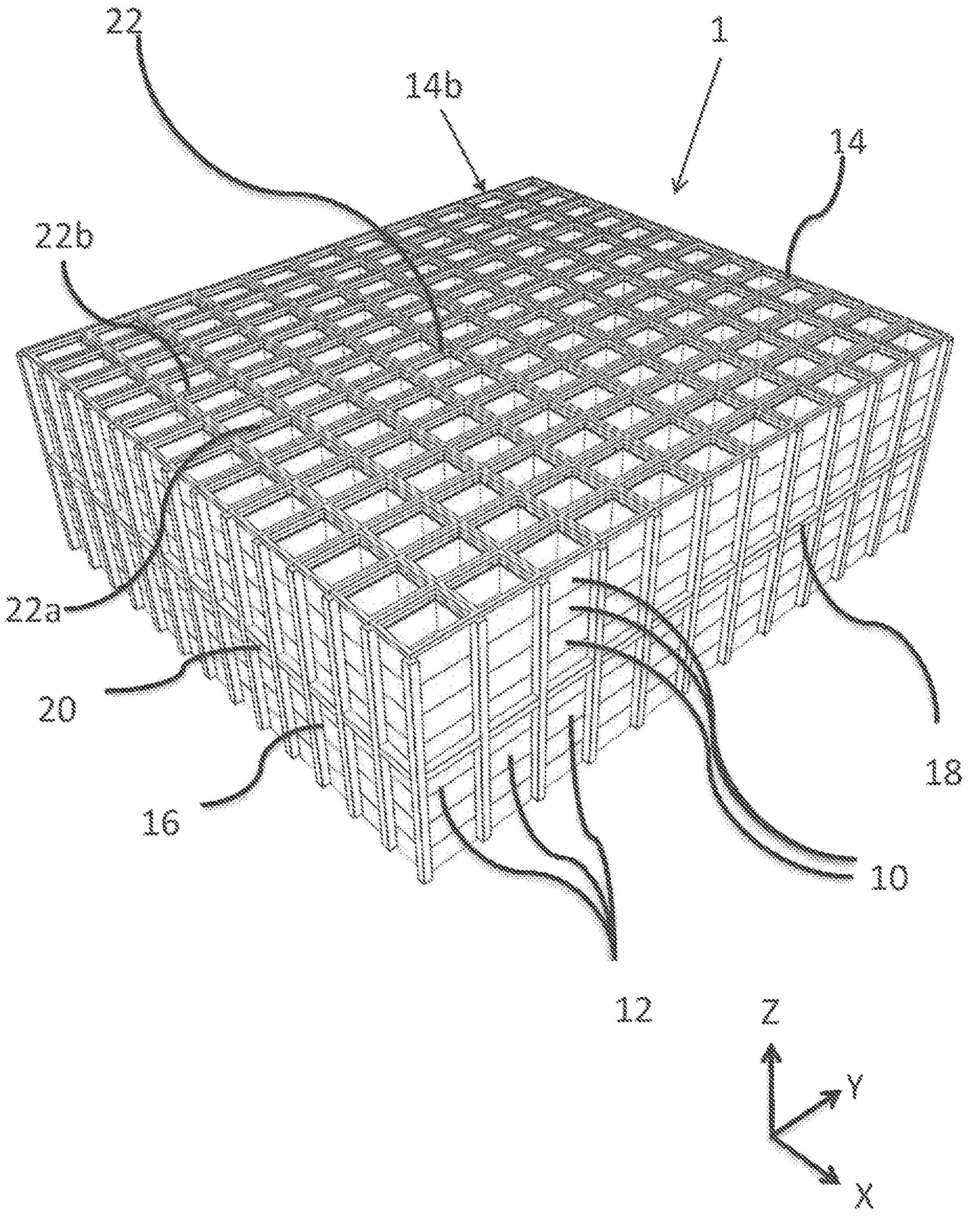
Figure 1 (PRIOR ART)
FIG. 1 is a schematic diagram of a grid framework structure according to a known system.
Figure 2:
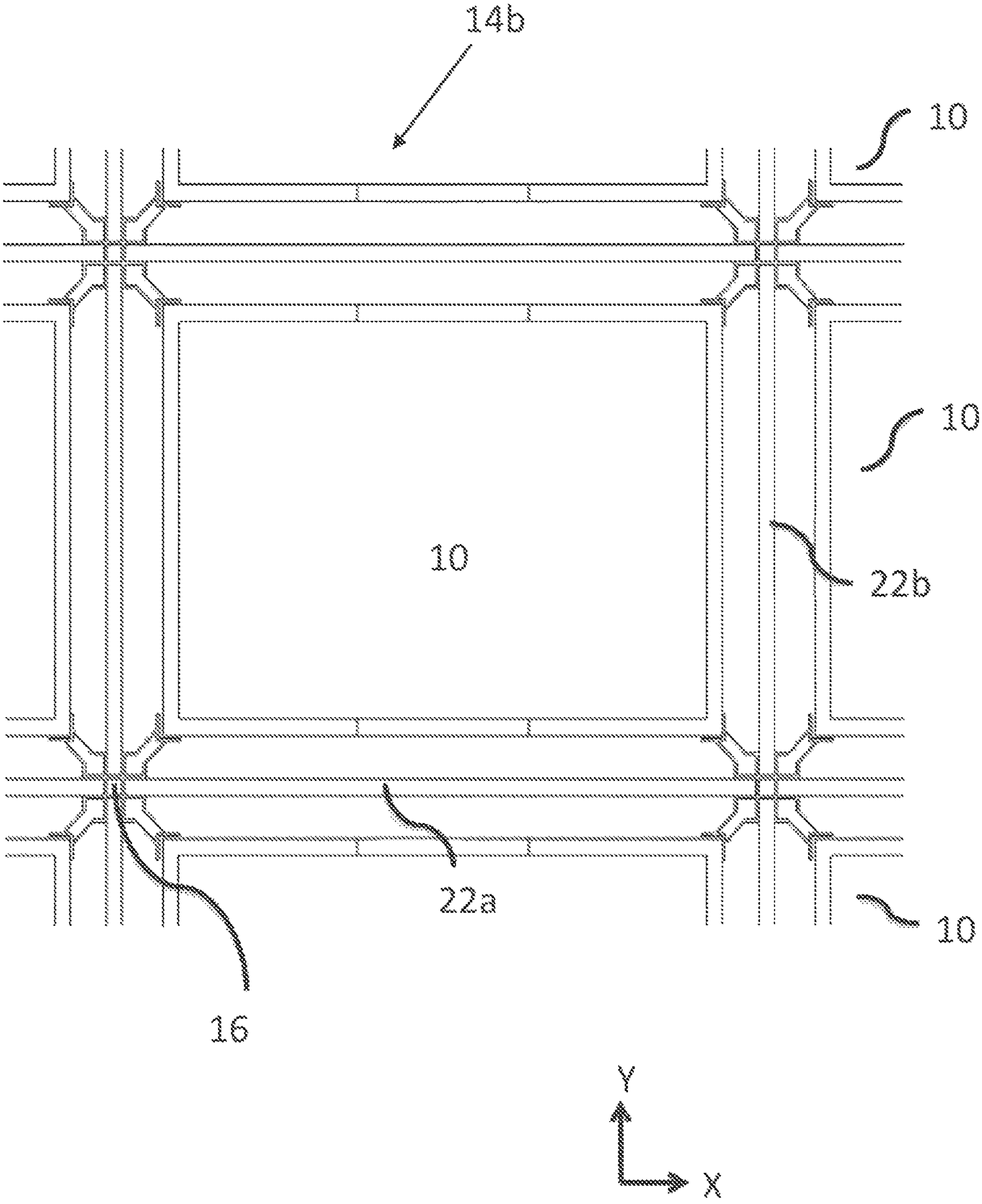
Figure 2 (PRIOR ART)
FIG. 2 is a schematic diagram of a top down view showing a stack of bins arranged within the framework structure of FIG. 1.
Figure 3:
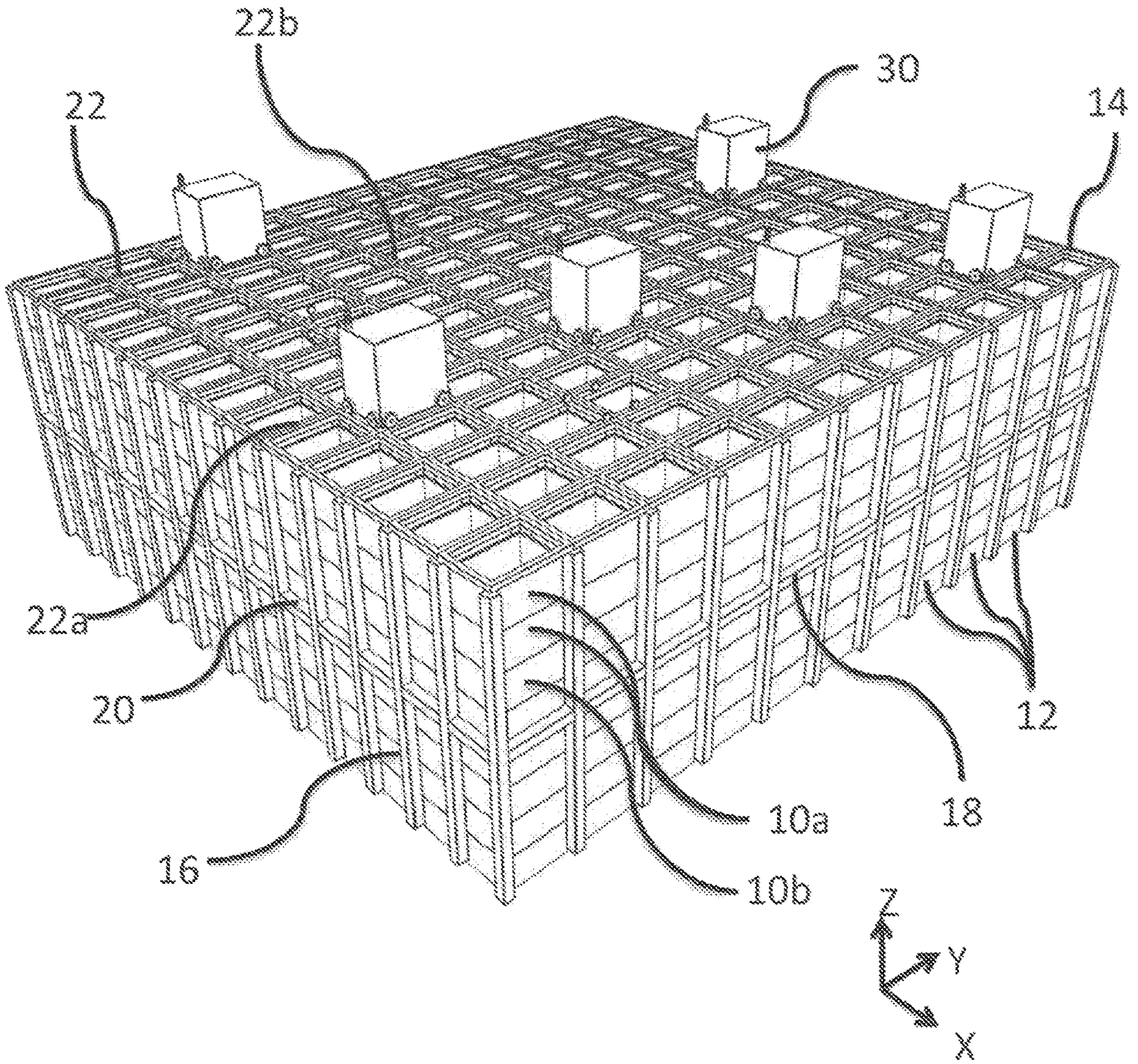
Figure 3 (PRIOR ART)
FIG. 3 is a schematic diagram of a known robotic load handling device operating on the grid framework structure.
Figure 4:
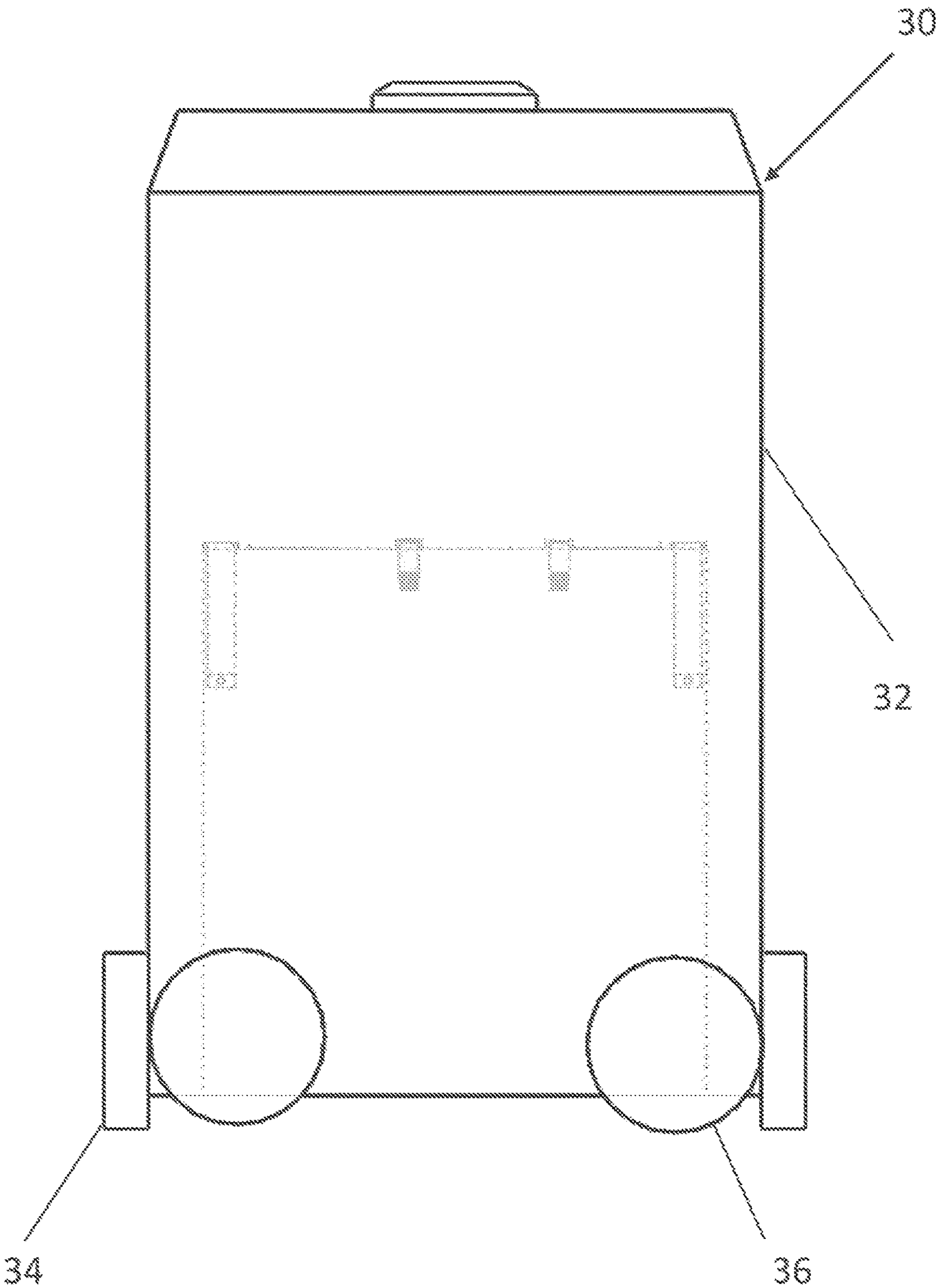
Figure 4 (PRIOR ART)
FIG. 4 is a schematic diagram of a load handling device according to a known system.
Figure 5:
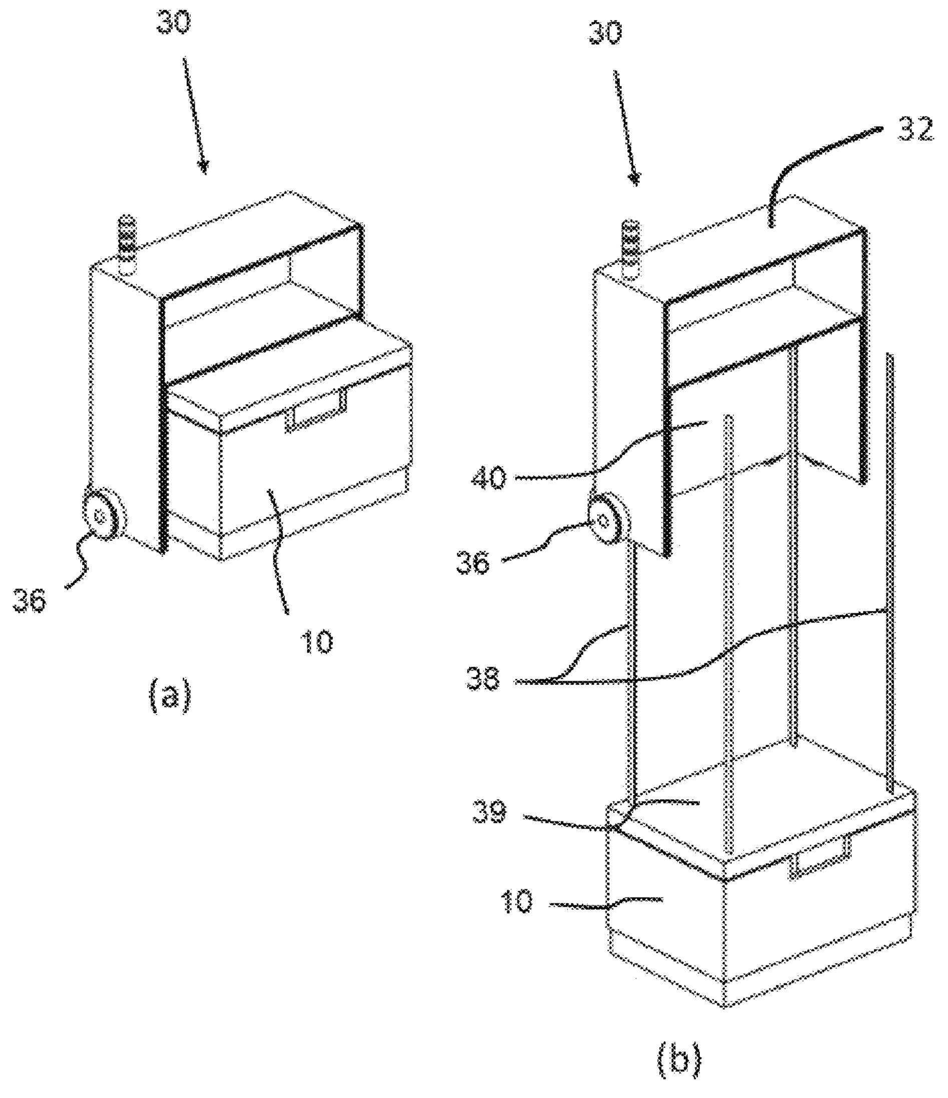
Figure 5 (PRIOR ART)
FIGS. 5(*a* and *b*) are schematic perspective cut away views of the load handling device of FIG. 4 showing (*b*) the container receiving space of the load handling device and (*a*) a container accommodating the container receiving space of the load handling device.
Figure 6:
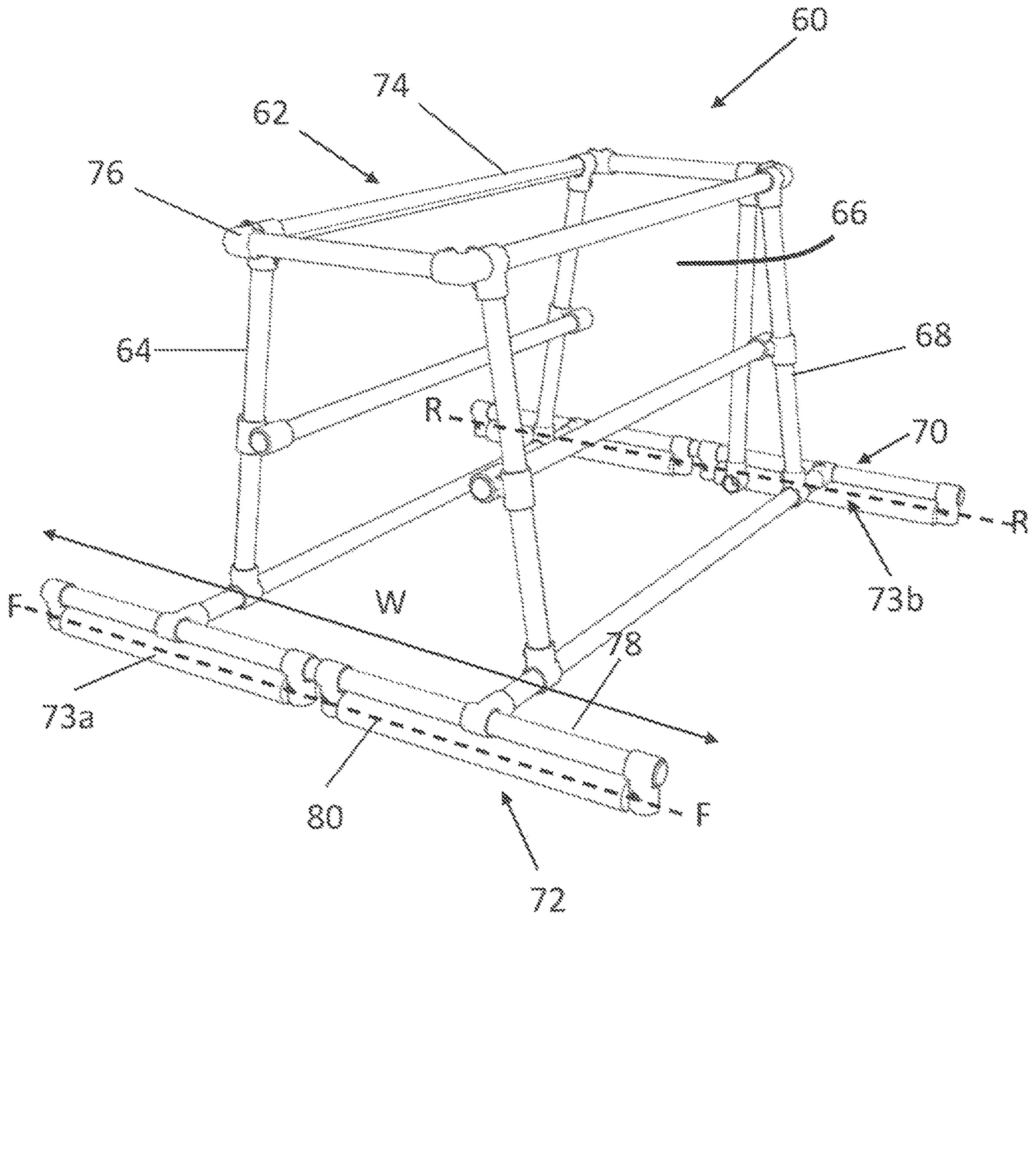
FIG. 6 is a perspective view of a fall restraint apparatus comprising a frame mounted to a rolling assembly according to an embodiment of the present invention.

FIG. 6 shows a fall restraint apparatus 60 according to an embodiment of the present invention. In contrast to the service vehicles known in the art, the fall restraint apparatus 60 of the embodiment of the present invention comprises a frame or frame structure 62 comprising an upper portion 64 with an open interior space 66 bounded by a plurality of vertical support frame members 68 and a lower portion 70 for mounting a rolling assembly 72. The rolling assembly 72 enables the fall restraint apparatus 60 of the present invention to be steered in any direction on the tracks (not shown) without any portion of the rolling assembly 72 falling into a grid opening. There are different embodiments of the rolling assembly according to the present invention to provide a rolling assembly that allows the fall restraint apparatus to be steered in any direction on the grid structure without any portion of the rolling assembly falling into a grid opening. In all of the different embodiments of the present invention, it is essential that the rolling assembly contacts the grid structure by at least two contact points on the grid structure and since the grid structure comprises a first set of parallel tracks extending in a first direction and a second set of parallel tracks extending in a second direction, the at least two contacts points is construed to mean that the rolling assembly contacts different tracks of the grid structure or different areas of the grid structure. The rolling assembly may also be freewheeling so as to enable an operative restrained to the frame to manually move the fall restraint apparatus on the grid structure, e.g. by walking on the grid structure. Further detail of the rolling assembly of the fall restraint apparatus according to the present invention is discussed below.

Referring to the particular embodiment of the fall restraint apparatus shown in FIG. 6, the frame 62 comprises an assemblage of frame members 74 connected together to provide an open interior structure 66 for accommodating at least operative within the open interior structure. The frame members 74 are connected together via a suitable fastener 76 to bear the load of at least one operative restrained to the frame 62. Suitable fasteners for connecting the frame members 74 together include but is not limited to welding, one or more bolts, adhesive etc. To provide a lightweight frame that can be lifted by at least one operative restrained to the frame 62, the frame members 74 can be tubular members with sufficient strength to bear the load of the at least one operative restrained to the frame. Example of tubular frame members include but is not limited to aluminium tubular frame members or an alloy comprising aluminium. Other examples of frame members, include the use of plastic materials or a composite material, e.g. carbon fibre reinforced plastic. The use of carbon fibre reinforced plastic materials for the frame members not only provides a strong frame sufficient to support at least one operative restrained to the frame but also helps to provide a lightweight frame so that the fall restraint apparatus of the present invention can easily be launched on the grid structure and manoeuvred in any direction on the grid structure. The combination of the use of lightweight materials and the open structure of the frame, provides a frame that is less than 100 kg, preferably, less than 60 kg, more preferably, less than 30 kg. Since the weight of the rolling assembly represents a small portion of the total weight of the fall restraint apparatus, the frame together with rolling assembly provides a lightweight fall restraint apparatus having a weight less than 100 kg, preferably less than 60 kg, more preferably less than 30 kg. The fall restraint apparatus 60 in the particular embodiment of the present invention shown in FIG. 6 comprising aluminium based tubular frame members is about 25 kg.

The lightweight frame 62 enables an operative within the open structure 66 of the frame to lift the frame and steer the fall restraint apparatus 60 on the grid structure. Steering the fall restraint apparatus 60 may involve lifting the frame 62 so that at least a portion of the rolling assembly 72 is lifted clear of the tracks rather than trying to rotate the fall restraint apparatus when the rolling assembly 72 is in full contact with the tracks. In the particular embodiment shown in FIG. 6, the frame 62 represents a greater proportion of the weight of the fall restraint apparatus and therefore, a lightweight frame results in a lightweight fall restraint apparatus. Thus, the lightweight fall restraint apparatus can be provided by the combination of the weight of the frame and the weight of the rolling assembly.

Figure 11:
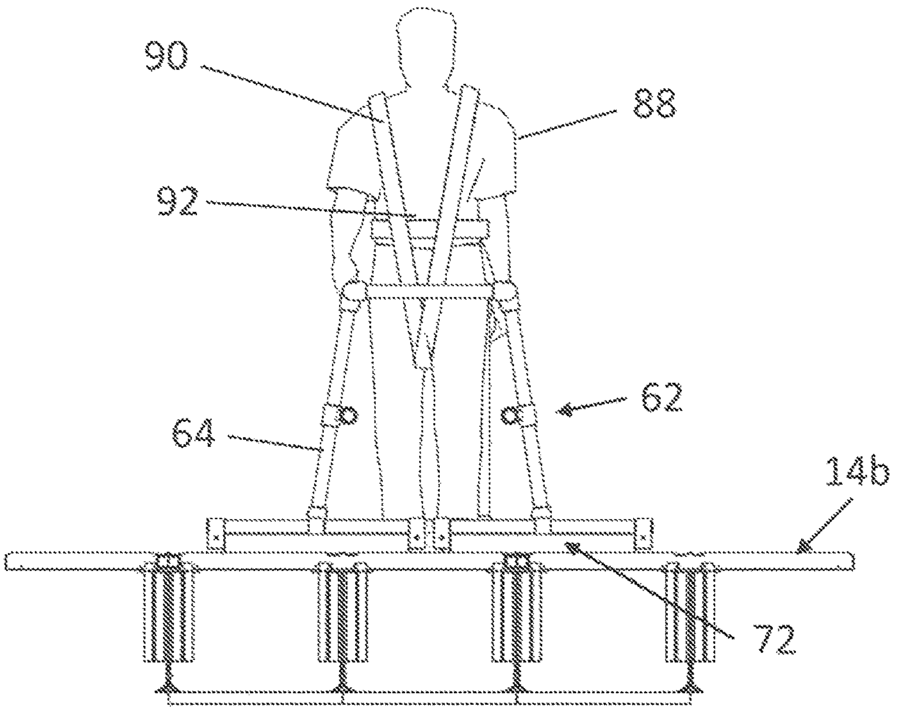
FIG. 11 is a perspective view of an operative restrained to the frame of the fall restraint apparatus via a harness according to an embodiment of the present invention.

In the particular embodiment of the present invention shown in FIG. 6, the upper portion 64 of the frame comprises at least one pair of parallel side frame members and a pair of parallel end frame members which are shorter than the parallel side frame members and which are fixed substantially perpendicular to the parallel side frame members in a common horizontal plane to define a rectangular frame structure. The parallel side frame members and the end frame members are arranged so as to provide the interior open space 66 for accommodating at least one operative (see FIGS. 11 and 15(*a* and *b*)). The rectangular frame structure of the upper portion 64 permits one or more operatives to be accommodated within the open interior space 66. The parallel side frame members and/or end frame members also provides a handle for the at least one operative to hold onto the frame whilst walking on the grid structure. The handle defined by the parallel side frame members and the end frame members are supported above the tracks by the plurality of support frame members or down frame members 68. As demonstrated in FIG. 11, the height of the parallel side frame members 74 is at about the operative's waist level so that the operative restrained within the open structure 66 can easily reach out and grip the parallel side frame members 74 when walking on the grid structure. In the particular embodiment of the present invention shown in FIG. 6, the frame members 74 are tubular members, e.g. aluminium tubes, but the frame members can be a bar or other materials discussed above. To increase the structural rigidity of the frame, one or more bracing members are used to brace parallel frame members. In the particular embodiment shown in FIG. 6, the frame members are assembled to provide opposing H-frames either side of the open structure 66. Other types of bracing members can be used to increase the structural rigidity of the frame, these include but are not limited to diagonal bracing members. The frame of the particular embodiment of the present invention can be envisaged to resemble a Zimmer® frame for the at least one operative to walk on the grid structure whilst holding the parallel side frame members 74.

The lower portion 70 of the frame comprises the rolling assembly 72 so as to enable the fall restraint system 60 to be manually driven on the grid structure. In the particular embodiment shown in FIG. 6, the lower portion 70 of the frame is connected to the upper portion 64 of the frame. The lower portion of the frame comprises a sub-frame 78 for mounting the rolling assembly 72. The rolling assembly is mounted to the sub-frame 78 such that the rolling assembly 72 has a width that extends across the length of one or more grid cells, more preferably one or more grid openings. For improved stability of the fall restraint apparatus 60 on the grid structure, in the particular embodiment of the present invention, the rolling assembly has a width, W, that extends across the longest length of at least two grid cells (see FIG. 6, FIG. 15*a* and FIG. 15*b*. Taking into consideration the longest length of grid cell to be 760 mm, this equates to a width of about 2×760 mm (1520 mm). Ideally, the width of the rolling assembly should have a length that extends across the maximum diagonal length of a given grid cell so as to enable the fall restraint apparatus 60 to be steered in any direction on the grid structure. In the particular example described above, this equates to a length of about 944 mm. The rolling assembly 72 shown in FIG. 6 comprises a front wheel assembly 73*a* and a rear wheel 73*b*, each wheel assembly of the front wheel assembly 73*a* and the rear wheel assembly 73*b* extending transversely to the longitudinal direction of the upper portion.

Figure 8:
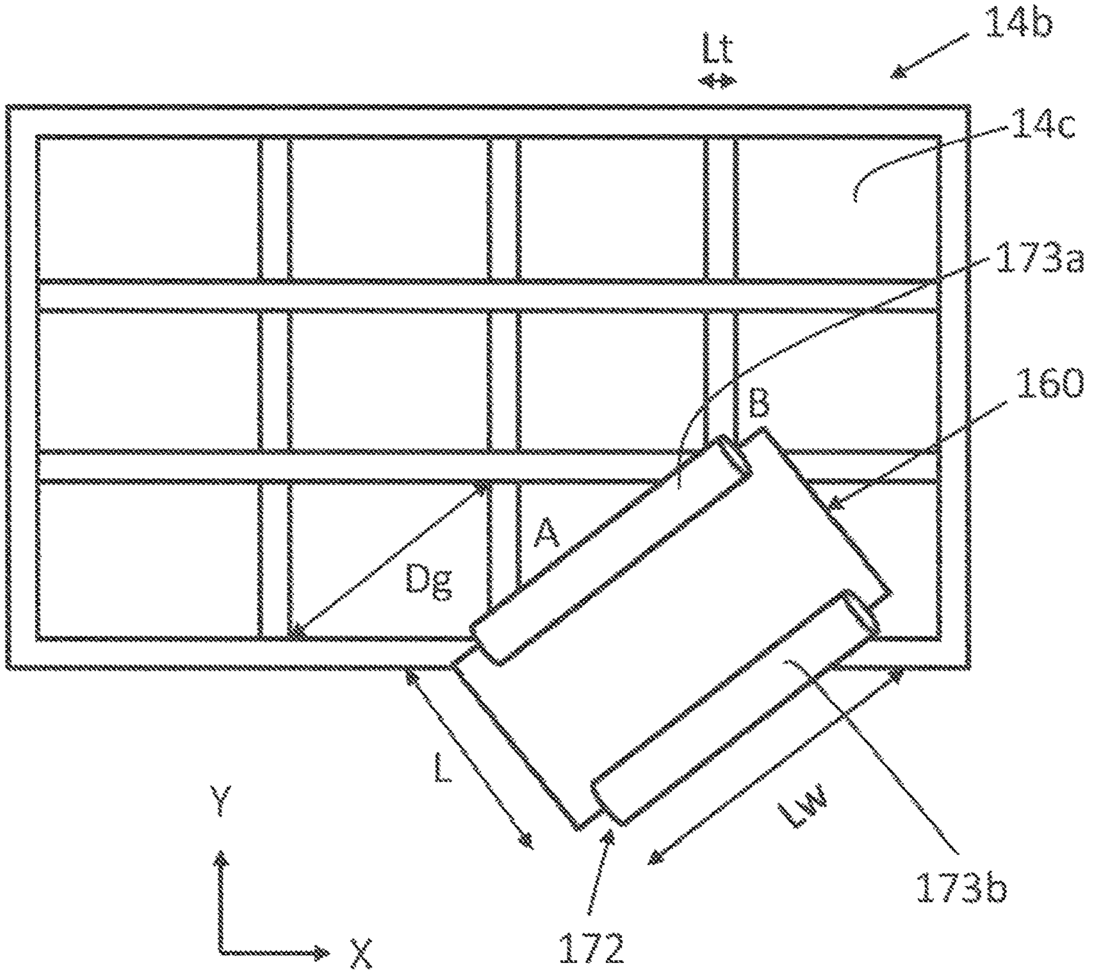
FIG. 8 is a schematic top plan view of the rolling assembly of an embodiment of the present invention of the fall restraint apparatus travelling over the grid structure.
Figure 9:
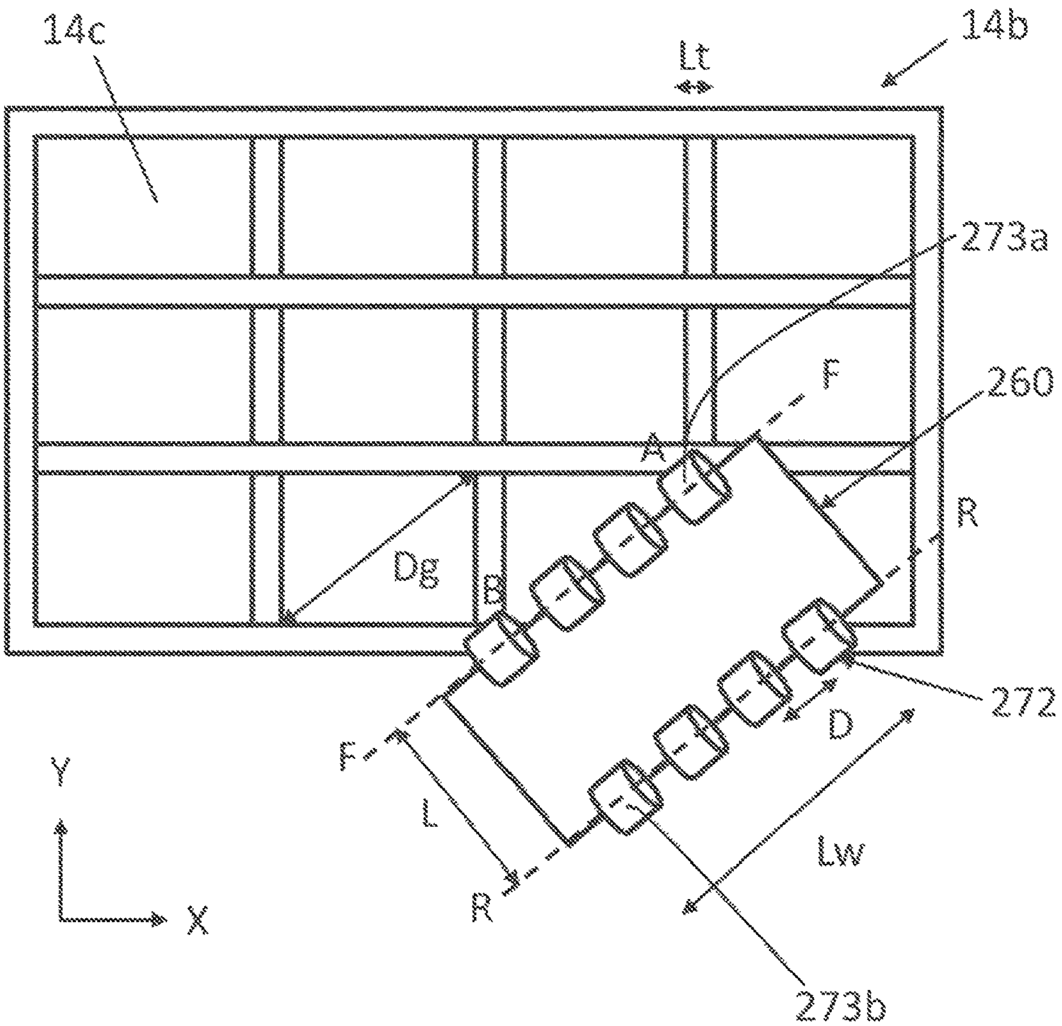
FIG. 9 is a schematic top plan view of the rolling assembly according to another embodiment of the present invention of the fall restraint apparatus travelling over the grid structure.

The width of the rolling assembly is chosen so as to prevent any portion of the rolling assembly falling into a grid opening and this can be demonstrated in the schematic drawing shown in FIGS. 8 and 9 in conjunction with FIG. 7. In both examples of the fall restraint apparatus 160, 260, the rolling assembly 172, 272 comprises a front wheel assembly 173*a*, 273*a* and a rear wheel assembly 173*b*, 273*b*, each wheel assembly of the front wheel assembly 173*a*, 273*a* and the rear wheel assembly 173*b*, 273*b* extending transversely to the length L of the upper portion. The wheel base which is the distance between the front and rear wheel assemblies extends beyond the length of one or more grid cells so as to permit an operative restrained to the upper portion of the frame to gain access to a grid opening. In the examples shown in FIGS. 8 and 9, the width of the front and rear wheel assemblies is such that each wheel assembly of the front and rear wheel assemblies is in contact with two different areas of the grid structure denoted by the reference A and B in FIGS. 8 and 9. As the grid structure is made up of a first set of parallel tracks extending a first direction and a second set of parallel tracks extending in the second direction, then each wheel assembly of the front and rear wheel assembly contacts different tracks of the grid structure in order to prevent any portion of the rolling assembly falling into a grid opening. There are numerous ways to achieve this. The first is shown in FIG. 8, and shows each wheel assembly of the front and rear wheel assembly comprises a single elongated roller having a length that extends across the maximum diagonal length Dg of a single grid opening 14*c*. The second example is shown in FIG. 9 and shows each wheel assembly of the front and rear wheel assemblies comprising a plurality of wheels. The plurality of wheels of the front and rear wheel assembly are arranged to rotate about a respective common rotational axis F-F (front axis) and R-R (rear axis). In both examples shown in FIGS. 8 and 9, the length Lw of each wheel assembly of the front and rear wheel assembly is such that the wheel assembly of the front and rear wheel assembly contacts two different tracks of the grid structure. For the purpose of the present invention, the length of each wheel assembly of the front and rear wheel assembly corresponds to the width, W, of the rolling assembly as shown in FIG. 6. In the particular embodiment shown in FIG. 6, each wheel assembly of the front and the rear wheel assembly extends outwardly of the upper portion 64 of the frame to sit on different areas of the grid structure, i.e. at least two different tracks. In the case where the wheel assembly comprises a plurality of wheels, the separation D between the wheels of the plurality of wheels is optionally less that the width of a single track, Lt, to prevent a track entering between the plurality of wheels (see FIG. 9). In both examples shown in FIGS. 8 and 9, the length of the wheel assembly of the front and rear wheel assemblies denoted by the reference, Lw, is greater than the maximum diagonal length of a grid opening 14*c* denoted by the reference, Dg. As a result, each wheel assembly of the front and rear wheel assembly contacts different tracks of the grid structure.

Figure 10:
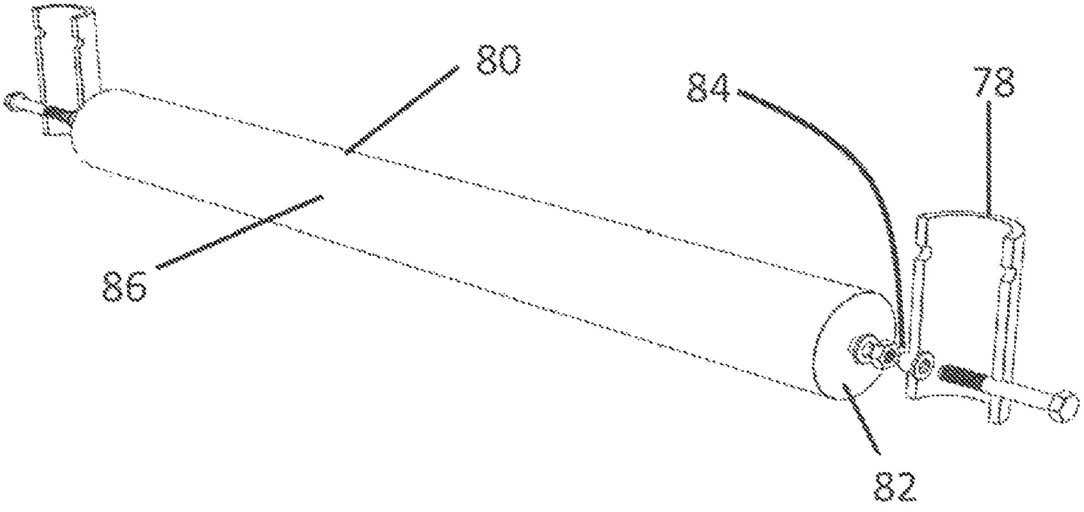
FIG. 10 is a perspective view of an elongated roller of a wheel assembly of the rolling assembly according to an embodiment of the present invention.

However, the present invention is not limited to the wheel assembly configuration shown in FIGS. 8 and 9, and other configurations of the wheel assembly are applicable in the present invention so as to contact two different tracks of the grid structure. In the particular embodiment shown in FIG. 6, the front and rear wheel assembly 73*a*, 73*b* comprises two rollers 80 that are rotatable about a common rotational axis, F-F and R-R. The wheels of front and rear wheel assemblies are respectively rotatable about one or more common shafts or axles. In the particular embodiment in FIG. 6, two rollers 80 are rotatably mounted on separate shafts at the front 73*a* and the rear 73*b* wheel assembly and are sufficiently separated so that each roller 80 of the front and the rear wheel assembly contacts a track of the grid structure. The length of each roller is less that the longest length of a grid cell, e.g. 700 mm, but the overall length of the two rollers including the separation between the rollers exceeds the length of the maximum diagonal length, Dg, of the grid opening 14*c*. An example of a single roller 80 for moving the frame of the fall restraint apparatus on the grid structure is shown in FIG. 10, and comprises a stainless steel roller 82 rotatably mounted on as shaft 84 which in turn is rotatably mounted to the lower portion 70 of the frame. The stainless steel roller 82 comprises an outer rubber sleeve 86 so as to prevent damage to the tracks, in particular the profiles of the tracks, when the fall restraint apparatus of the present invention is moved across the grid structure.

An operative 88 can be restrained to the upper portion 64 of the frame 62 via a suitable harness 90. In the particular embodiment shown in FIG. 11, an operative 88 wearing a suitable harness 90 can be attached to the upper portion 64 of the frame 62 via one or more fasteners (not shown). Commercially available harnesses for restraining the operative to the upper portion of the frame include DBI-SALA®ExoFit™. Examples of secure fasteners to restrain the operative to the upper portion of the frame include but are not limited to carabiners or shackles. The at least one operative can be restrained to the upper portion of the frame by being attached to one of the parallel side frame members or end frame members of the frame 62. The frame 62 of the fall restraint apparatus functions like a Zimmer® frame enabling an operative to walk safely on the tracks whilst holding onto the upper portion of the frame, in particular the parallel side frame members. However, should an operative accidently slip into a grid cell, the operative can be restrained to the frame via an inertia reel 92 coupled to the frame 62, in particular to the upper portion of the frame. The inertia reel 92 prevents the operative restrained to the upper portion of the frame from falling too far into a grid cell. Other methods of restraining an operative and thereby, preventing the operative from falling into a grid opening are applicable in the present invention including various harnesses or ropes.

Figure 12:
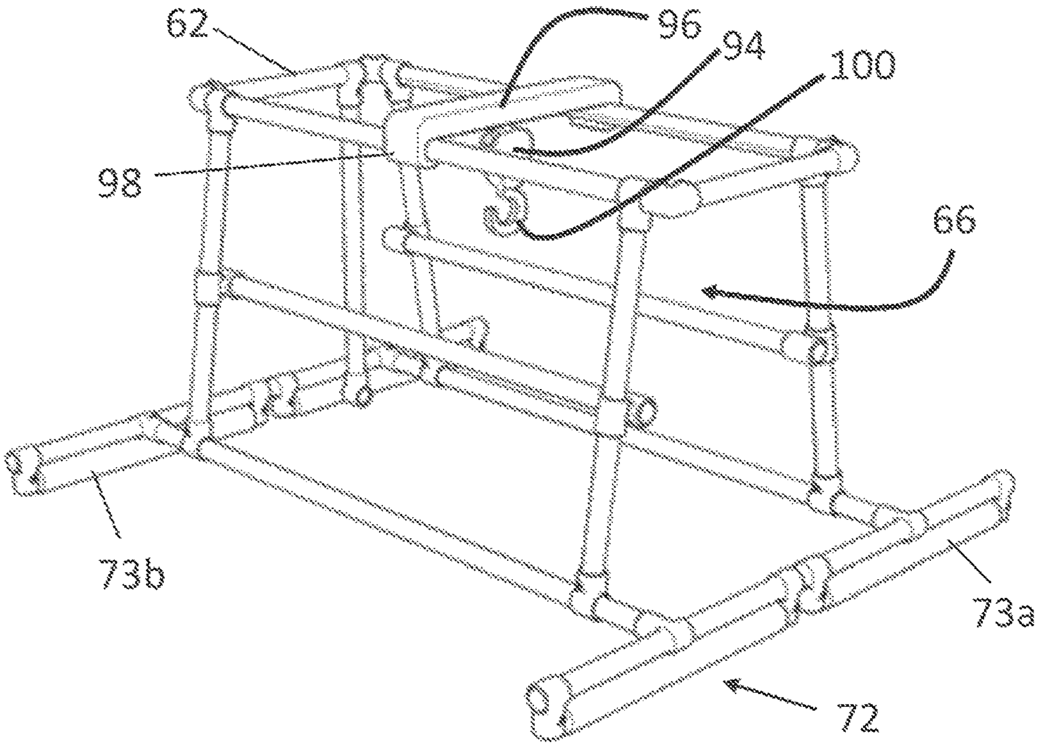
FIG. 12 is perspective view of the fall restraint apparatus shown in FIG. 6 comprising a suspension beam and winch according to an embodiment of the present invention.

The fall restraint apparatus of the present invention can be used as a recovery apparatus should a person be injured on the grid structure or having fallen down a grid opening. In the particular embodiment shown in FIG. 12, the frame 62 comprises a winch 94 attached to a suspension frame member or suspension beam 96. The suspension frame member or suspension beam 96 is sufficiently strong to bear the weight of an operative which can weigh as much as 100 kg or more. In the particular embodiment of the present invention shown in FIG. 12, the suspension beam 96 extends across the open structure 66 onto the parallel frame members in the upper portion of the frame and is removably supported or fixed to the parallel frame members via inwardly turned ends 98. The winch 94 enables an injured person to be suspended from the suspension beam 96 so as to be carried to safety at the edge of the grid structure. The winch 94 having a winch cable is sufficiently long so that the winch cable can be reeled down a grid opening which can be as high as 21 containers high (e.g. in excess of 3 m). At the end of the winch cable is a hook 100 or other fastener means to latch onto a person that has fallen onto the tracks or down a grid opening. A stretcher (not shown) can be attached to the winch 94 to assist with the safe removal of the injured person from the grid structure. The winch can be manually driven or motorised so giving the operative restrained to the frame more control to safely winch the injured person from the tracks.

Not only can the winch lift an injured person that has fallen onto the tracks or down a grid opening, the winch can also be used to upright a load handling device that has toppled on the tracks. Occasionally, one or more load handling devices can topple over on the grid structure and cause a section of the grid to be declared non-operational until the toppled load handling device can be made upright or be retrieved to the edge of the grid structure should the load handling device malfunction. This results in an increased downtime of the section of the grid structure. The fall restraint apparatus of the present invention comprising the winch can be used to upright a toppled load handling device since the fall restraint apparatus can be quickly launched on the grid structure and be able to reach the stricken load handling device on the grid structure.

Figure 13:
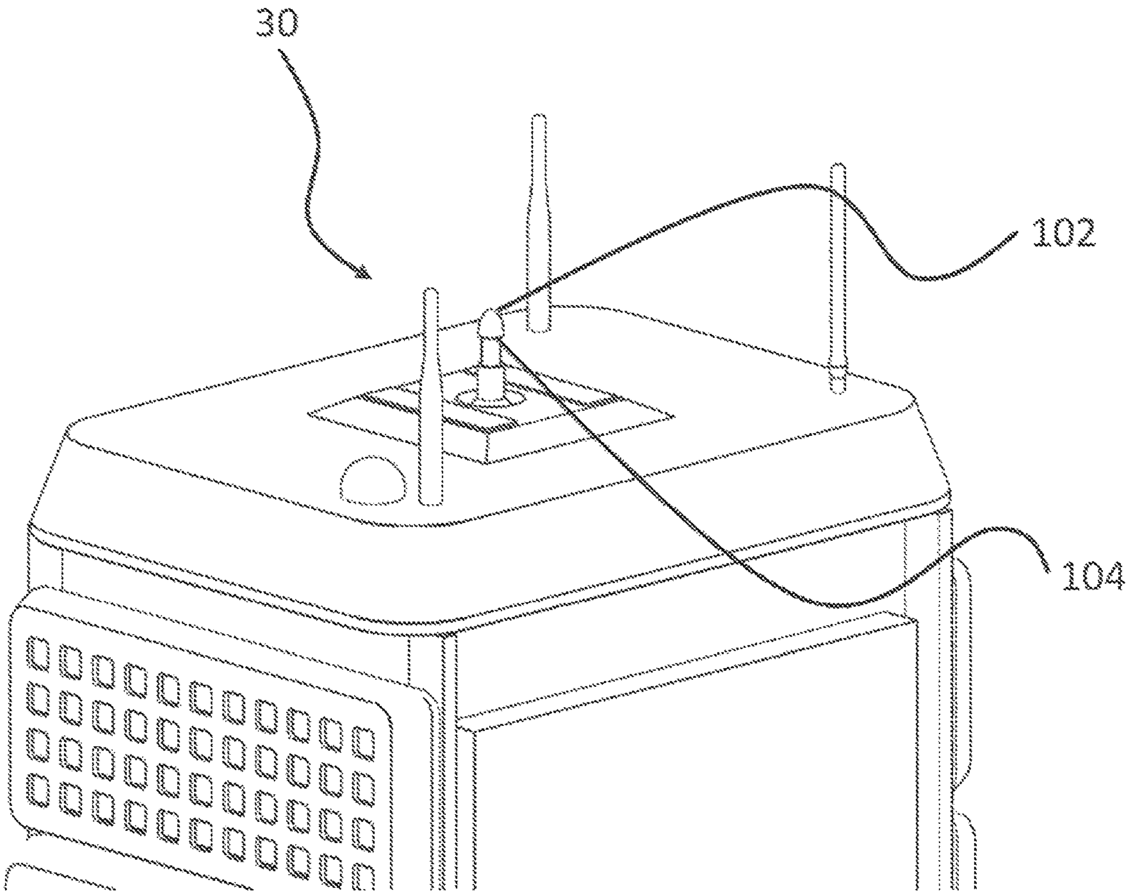
FIG. 13 is a top perspective view of a load handling device showing a hoist element at the top surface of the load handling device.
Figure 14:
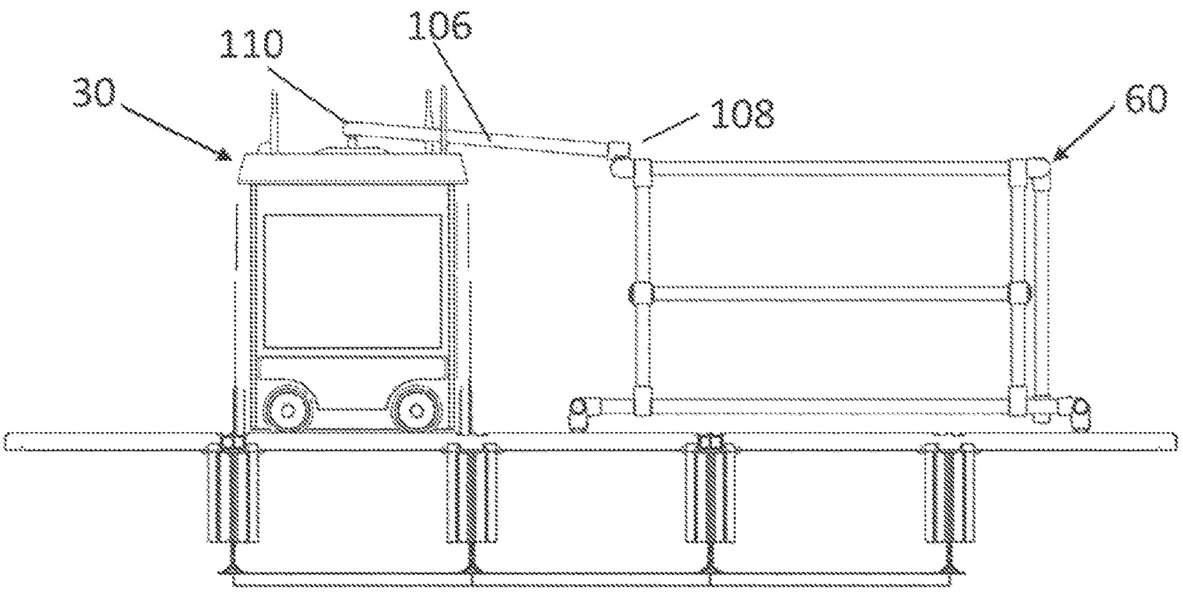
FIG. 14 is a schematic drawing of the fall restraint apparatus comprising a tow bar for towing a load handling device according to an embodiment of the present invention.

The top of the load handling device comprises a hoist element that can be used to hoist the load handling device from the tracks. FIG. 13 shows a hoist element 102 used for manual movement of the load handling device 30. The hoist element 102 comprises a cutaway below a bulbous head which gives rise to an underside 104. The hoist element 102 is so designed to permit the attachment of a hoist to lift the load handling device 30 from a grid cell. In certain occasions, the load handling device may malfunction and become stranded on the tracks. Typically in the art, to retrieve the malfunctioned load handling device, the load handling device is winched by a service vehicle so that the wheels of the load handling device are lifted clear of the tracks and the malfunctioned load handling device is placed on a platform in the service vehicle whereupon it is transported to the edge of the grid structure. However, there may not be enough height above the load handling device to lift the load handling device clear of the tracks. This is particularly the case, where the headroom above the load handling device in the distribution centre or fulfilment centre is only sufficient to enable a load handling device to be operative on the tracks but is insufficient to accommodate a tall winch assembly in excess of 2 meters. To overcome this problem, the fall restraint apparatus of the present invention comprises a tow bar that is able to couple onto a stricken load handling device and tow the load handling device to the edge of the grid structure instead of suspending the load handling device clear of the tracks. As shown in FIG. 14, one end 108 of the tow bar 106 is fixed to the frame of the fall restraint apparatus 60 of the present invention and the other end 110 of the tow bar 106 is coupled to or interfaces with the load handling device 30, more particularly, interfaces with the hoist element 102 at the top of the load handling device. One or more operatives restrained to the frame of the fall restraint apparatus 60 can then manually pull or push the stricken load handling device to the edge of the grid structure. The wheels of the load handling device can be dis-engaged so enabling the load handling device to be free wheeled on the tracks and thereby allowing an operative restrained to the frame to either push or pull the load handling device on the tracks. Whilst the particular embodiment in FIG. 14 shows the tow bar attached to the top of the load handling device, other means to attach the tow bar to the load handling device such as at the base of the load handling device provide more stability when towing the load handling device to the edge of the grid structure.

Figure 15A:
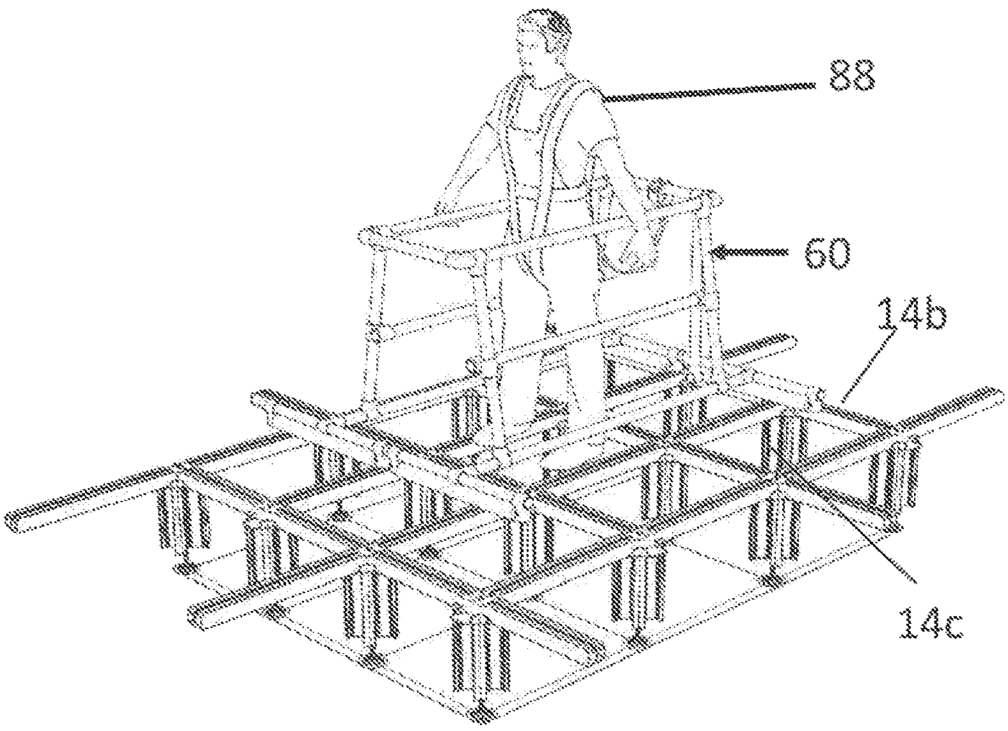
FIGS. 15*a* and 15*b* are perspective images showing 15*a* an operative restrained to the fall restraint apparatus walking on the grid structure, and 15*b* an operative restrained to the fall restraint apparatus steering the fall restraint apparatus by lifting at least a portion of the rolling assembly.
Figure 15B:
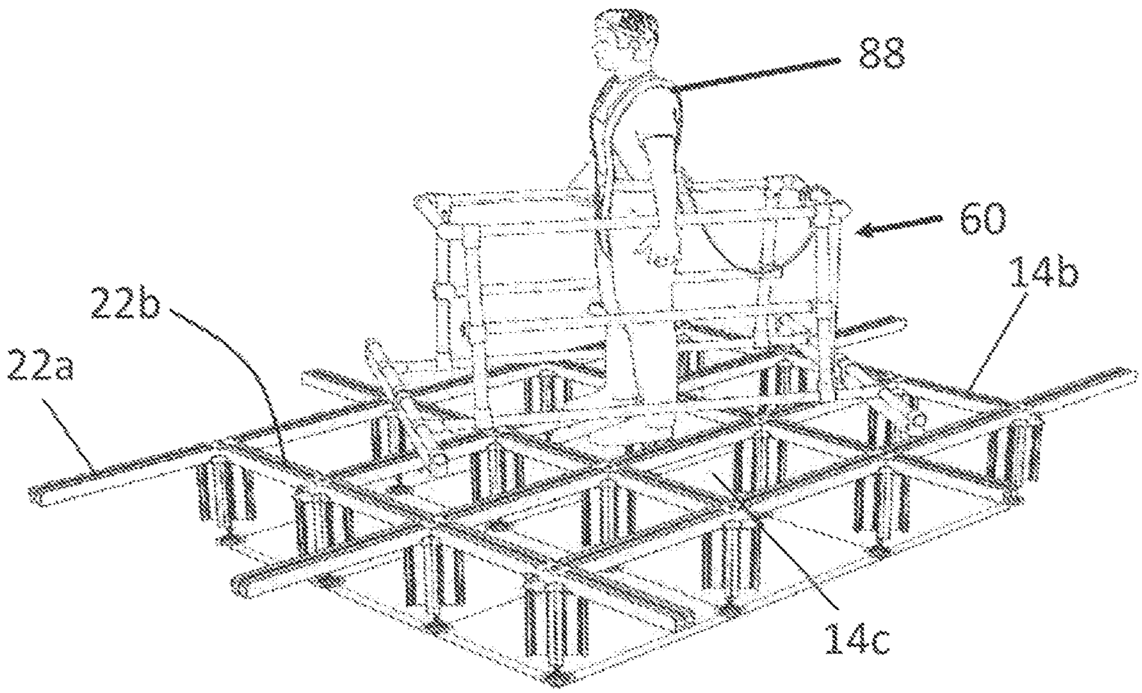

In use, when requiring access to the grid structure, an operative can lift the fall restraint apparatus simply by lifting the frame and placing it on the tracks so that the rolling assembly mounted to the frame abuts the tracks. The operative can enter the open structure and be restrained to the upper portion of the frame as shown in FIG. 15*a*. While holding onto the parallel side frame members, the operative restrained to the upper portion of the frame can walk on the grid structure 14*b* by stepping on the tracks 22*a*, 22*b*. The width of the rolling assembly is such that any portion of the rolling assembly is prevented from falling into a grid opening 14*c*. To manoeuvre or steer on the grid structure, the operative can simply lift the frame so that at least a portion of the rolling assembly is lifted clear of the tracks as shown in FIG. 15*b*, The operative can then rotate the frame to a desired orientation on the grid structure without the problem of any portion of the rolling assembly falling into a grid opening 14*c*. Having a frame that is lightweight as discussed above allows the fall restraint apparatus to be easily lifted and rotated on the tracks. The operative restrained to the upper portion of the frame, more specifically within the open structure of the frame, can the walk to the desired location or grid cell of the grid structure.

Figure 16:
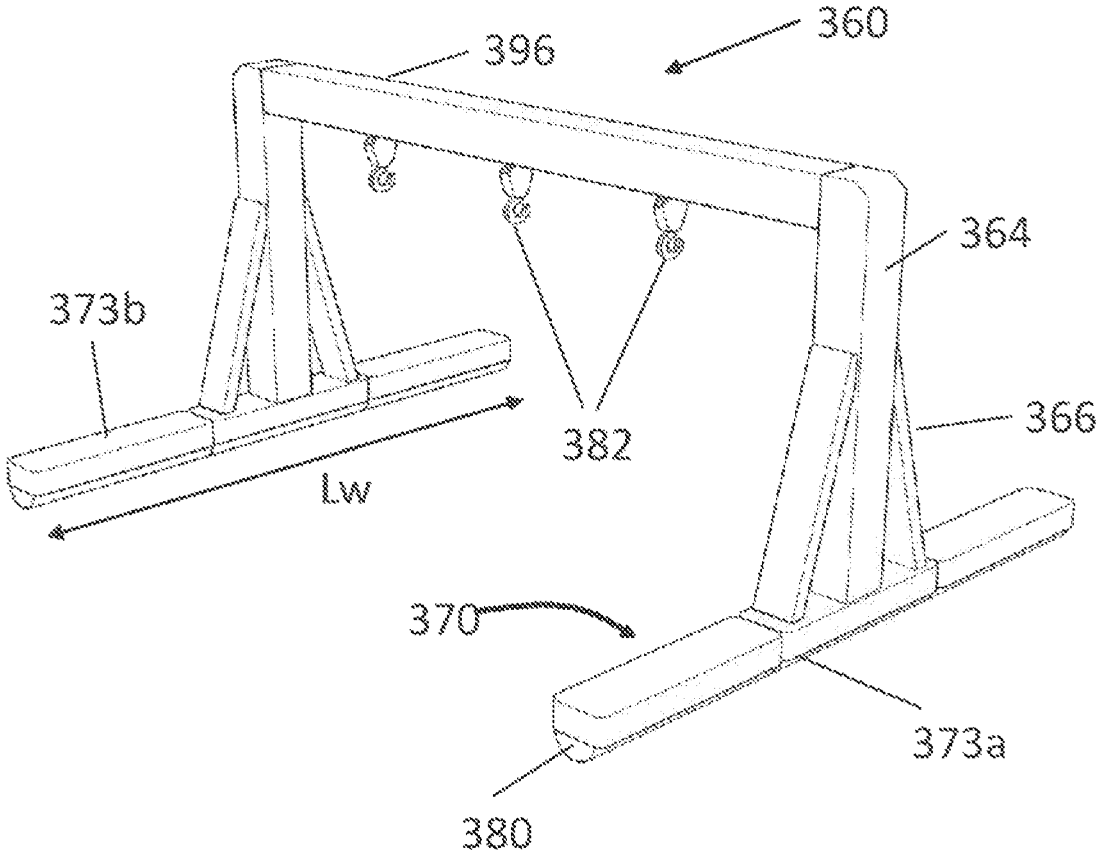
FIG. 16 is a schematic drawing of a fall restraint apparatus comprising an elongated suspension beam according to a second embodiment of the present invention.

Whilst the particular embodiment shown in FIG. 6 shows an open structure closed by the parallel frame members, other types of frames can be used to restrain at least one operative to the upper portion of the frame. In a second embodiment of the fall restraint apparatus 360 of the present invention shown in FIG. 16, the upper frame 364 comprises opposing A-frames 366 or diagonal frame members that meet at an apex close to the top of the frame. The A frames 366 support a suspension frame member or suspension beam 396 disposed between the opposing A frames 366. In comparison to the upper portion of the frame shown in FIG. 6, the at least one operative is suspended from the suspension beam 396 disposed between the opposing A-frames 366. The front 373*a* and rear 373*b* wheel assemblies are respectively mounted to the base of the A-frames such that the length of the suspension beam corresponds to the wheel base of the fall restraint apparatus 360, i.e. the distance between the front 373*a* and rear 373*b* wheel assemblies. The suspension beam 396 is elongated so as to enable more than one operative to be suspended from the suspension beam, e.g. via an inertia reel (not shown) coupled to the suspension beam. As shown in FIG. 16, one or more hooks 382 are suspended from the suspension beam 396 so as to allow an operative or winch assembly (not shown) to be attached to the suspension beam 396. The fall restraint apparatus 360 can adopt the same or similar rolling assembly 370 of the first embodiment of the present invention described above, in that the rolling assembly comprises a front wheel assembly 373*a* and a rear wheel assembly 373*b*. The length, Lw, of each wheel assembly of the front and rear wheel assembly extends across a grid opening 14*c* so that the wheel assembly contacts different tracks or areas of the grid structure (at least two contact points) when travelling on the grid structure to prevent any portion of the rolling assembly falling into a grid cell opening. In the second embodiment of the fall restraint apparatus 370, each wheel assembly of the front and rear wheel assembly comprises three elongated rollers 380 rotatable about a respective common axis. Like the first embodiment of the fall restraint apparatus, the front and rear wheel assemblies 373*a*, 373*b* extend transversely to the longitudinal direction of the suspension beam 396 such that an operative restrained to the suspension beam is able to move the fall restraint apparatus in the longitudinal direction when walking on the grid structure. One or more winch assemblies (not shown) discussed above can be mounted to the suspension beam 396. The elongated suspension beam 396 according to the second embodiment of the present invention provides enough clearance for the fall restraint apparatus to be positioned over a grid cell and the winch assembly (not shown) mounted to the elongated suspension beam can hoist a malfunctioned load handling device clear of the grid structure.

Different arrangements of the frame members can be used in the upper portion of frame depending on the application of the fall restraint apparatus. In the first embodiment, the frame members are arranged to provide an interior open structure to support an operative restrained to the frame to walk on the tracks. In the second embodiment shown in FIG. 16, the frame members are arranged to provide opposing A-frames and a suspension beam disposed between the A-frames to define a gantry so as to allow the fall restraint apparatus to easily hoist larger objects such as a malfunctioned load handling device. In both embodiments of the present invention, the frame is light enough to be easily moved on the track and the rolling assembly extends outwardly of the upper portion of the frame so as to abut different areas of the grid structure or tracks thereby providing improved stability of the fall restraint apparatus on the grid structure, i.e. the footprint occupied by the rolling assembly is greater than the footprint occupied by the upper portion of the frame. This enables the fall restraint apparatus to be easily moved and steered on the grid structure since the frame is light enough for at least a portion of the rolling assembly to be lifted clear of the tracks. Whilst not shown in FIG. 16, a tow bar can be incorporated onto the fall restraint apparatus of the second embodiment of the fall restraint apparatus 360 in order to push or pull a stricken load handling device coupled to the tow bar to the edge of the grid structure.

Figure 17:
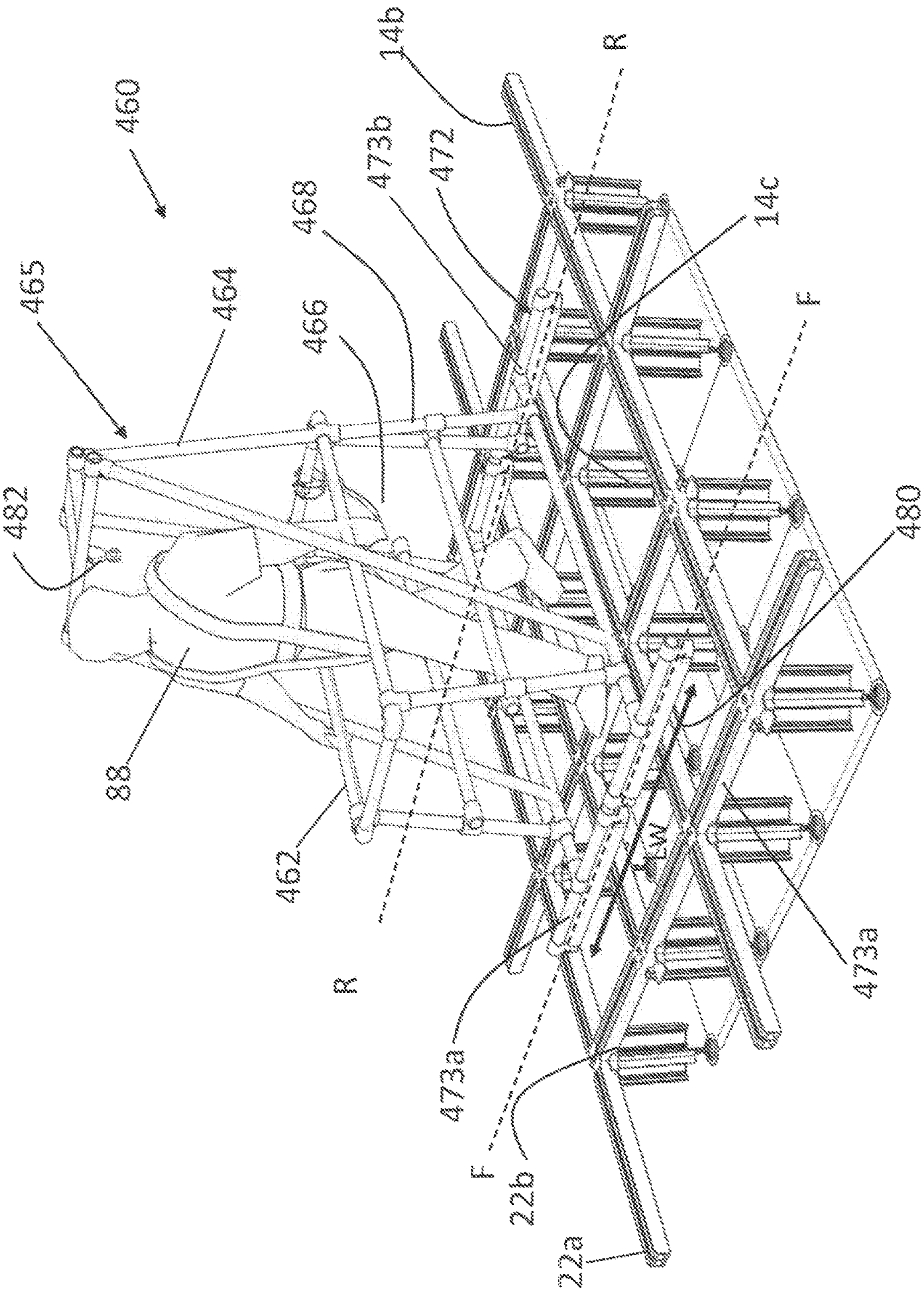
FIG. 17 is a schematic view of a fall restraint apparatus according to a third embodiment of the present invention.

An adaption of the first embodiment of the fall restraint apparatus shown in the fall restraint apparatus 460 in FIG. 6 comprising an interior open structure 466 for restraining an operative 88 to the frame 462 is shown in a third embodiment of the present invention in FIG. 17. As with the first and second embodiment of the present invention shown in FIGS. 6 and 16, the fall restraint apparatus 460 of the third embodiment of the present invention comprises a frame 462 comprising an upper portion 464 for restraining the at least one operative 88 to the frame 462 and a lower portion 468 for mounting the rolling assembly 472. The fall restraint apparatus 460 is adapted with the same or similar rolling assembly 472 as the other embodiments of the present invention in that the stability of the frame 462 on the grid is provided by a rolling assembly mounted to the lower portion extending outwardly of the upper portion across a grid opening. Crucially, the rolling assembly 472 comprises a front wheel assembly 473*a* and a rear wheel assembly 473*b*. Each wheel assembly of the front and rear wheel assembly 473*a* having a length Lw that extends cross a grid opening 14*c* and running transversely to the longitudinal direction of the upper portion 464 such that the wheel assembly 473*a*, 473*b* contacts the grid 14*b* at two points or two different tracks 22*a*, 22*b* as shown in FIG. 17. In the particular embodiment of the present invention, each wheel assembly 473*a*, 473*b* of the front and rear wheel assembly comprises elongated rollers, more specifically two elongated rollers 480 that are arranged to rotate about a common axis, F-F and R-R respectively.

In contrast to the first embodiment of the present invention shown in FIG. 6, the upper portion 464 of the frame additionally comprises upwardly extending frame members that are braced or connected together to form a hoisting or lifting frame 465 for supporting a winch 482. In the particular embodiment of the present invention shown in FIG. 17, the hoisting frame 465 comprises upwardly extending tubular frame members that are connected to the lower portion 468 of the frame and the parallel frame members in the upper portion of the frame. The hoisting frame 465 can double up as a roll cage for protecting the operative within the upper portion 468 of the frame should the fall restraint apparatus 460 topple on the grid structure 14*b*. A winch 482 is mounted to the hoist frame 465 such that the winch 482 is suspended from the uppermost portion of the hoisting frame. As with the other embodiments of the present invention, in operation the operative restrained to the frame is able to walk on the tracks 22*a*, 22*b* whilst holding onto the parallel frame members. To steer the fall restraint apparatus on the grid, the operative simply lifts the frame such that at least a portion of the rolling assembly 472 is lifted clear of the tracks allowing the operative to rotate the frame in a desired orientation. The key of the present invention is to be able to have a lightweight fall restraint apparatus in order to lift at least a portion of the rolling assembly off the tracks so as to enable to steer the fall restraint apparatus on the grid. Preferably, the fall restraint apparatus has a weight less than 100 kg, preferably, less than 60 kg, more preferably, less than 30 kg. The provision of a lightweight frame comprising an assembly of tubular frame members to form an open structure allows for a lightweight fall restraint apparatus.

Figure 18:
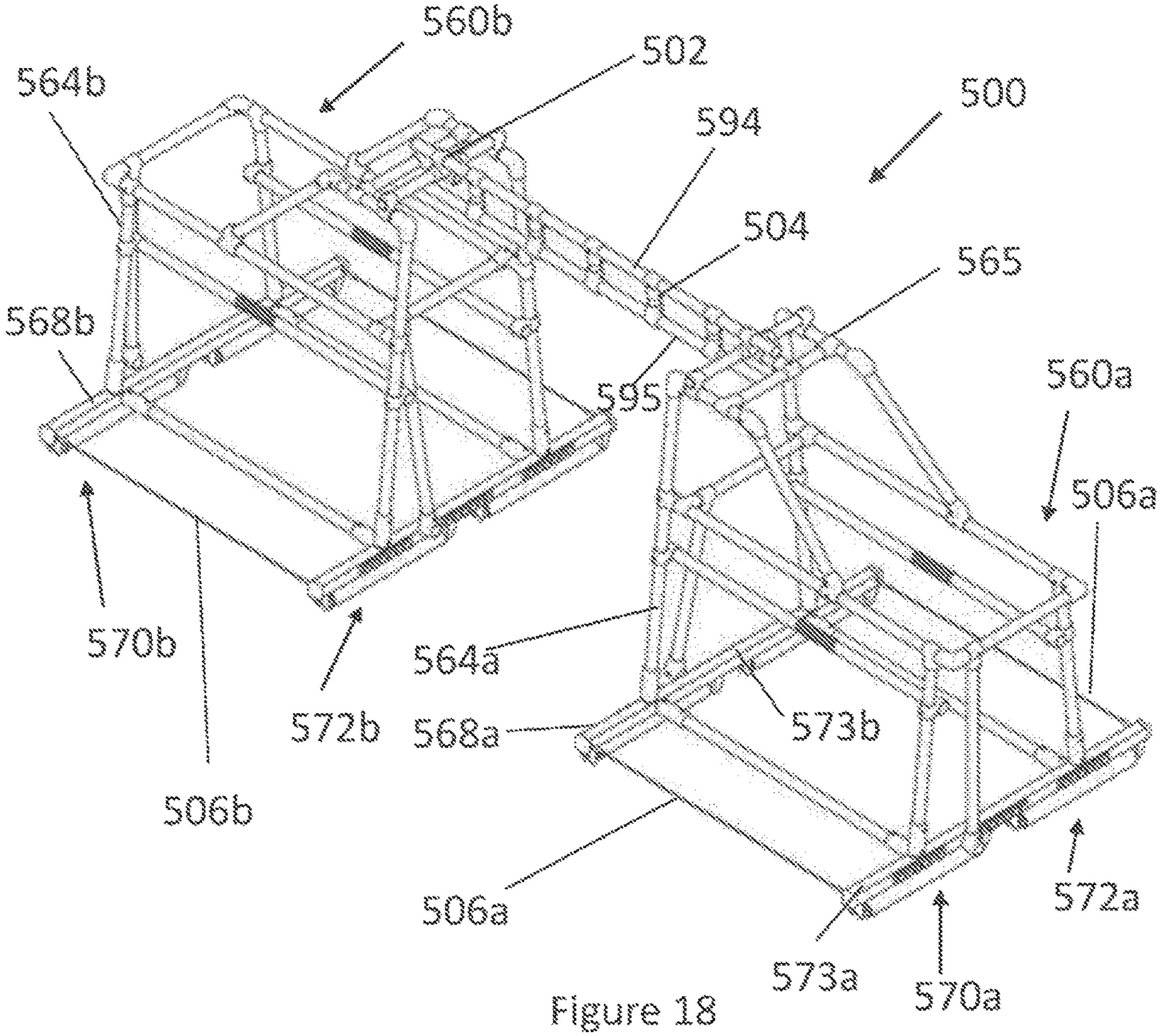
FIG. 18 is a schematic drawing showing an assembly of fall restraint apparatuses linked together by a suspension beam according to a fourth embodiment of the present invention.

In yet a further embodiment of the present invention, two or more of the fall restraints apparatus of the first and/or the third embodiments of the present invention shown in FIGS. 6 and 17 can be joined together by a linkage 594 to form an assembly 500 as shown in FIG. 18. By allowing two or more fall restraint apparatus 560*a*, 560*b* to be joined together by a linkage 594 to form an assembly 500 increases the load carrying capability of the assembly since two or more operators can drive the assembly on the tracks. Each of the two or more fall restraint systems can be operated independently relative to each other such that a person restraint in each of the two or more fall restraint apparatus are able to independently manoeuvre their respective fall restraint apparatus by lifting at least a portion of its rolling assembly. In the particular embodiment shown in FIG. 18, a first 560*a* and second 560*b* fall restraint apparatus are shown spaced apart and separated by the linkage 594 to define a work area between the first 560*a* and second 560*b* fall restraint apparatus. The linkage 594 extending between the first 560*a* and second 560*b* fall restraint apparatus can be a suspension or horizontal beam or suspension frame member for suspending a malfunctioned robotic load handling device above the tracks and/or an operative working on the tracks.

The suspension beam or suspension frame member 594 can be mounted to the upper portion 564*a*, 564*b* of the frame structure of the first and second fall restraint apparatus. The mounting of the ends of the suspension beam or the suspension frame member 594 to the upper portion of the frame structure at each of the first and second fall restraint apparatus resembles the hoisting frame shown in FIG. 17 comprising upwardly extending tubular frame members either side of the frame structure of the fall restraint apparatus and braced together by a frame member extending across the frame structure in a direction substantially perpendicular to the longitudinal direction the suspension frame member. The hoisting frame 565 helps to elevate the suspension frame member 594 above the tracks sufficient to suspend a load handling device from the suspension frame member or optionally, a person to be tethered to the suspension frame member whilst standing on the tracks.

One or more operators restrained in each of the first 560*a* and second 560*b* fall restraint apparatus are able to move their respective first and second fall restraint apparatus on the tracks such that the first and second fall restraint apparatus behaves as a tandem on the tracks, i.e. the movement of the assembly on the tracks is dependent on the operators restrained in the first and second fall restraint apparatus moving their respective fall restraint apparatus. One or both ends 502 of the suspension beam or the suspension frame member 594 is/are mounted to the first 560*a* and/or second 560*b* fall restraint apparatus by a pivotable joint such that the first fall restraint apparatus 560*a* can move independently of the second fall restraint apparatus 560*b* on the tracks. This allows the first fall restraint apparatus to swing around relative to the second fall restraint apparatus whilst still being linked together on the tracks.

In the particular embodiment shown in FIG. 18, the linkage joining the first and second fall restraint apparatus is a suspension frame member 594 comprising parallel beams 595 braced by one or more tie rods 504 in a ladder-type arrangement to provide more support to the suspension frame member from buckling when suspending a robotic load handling device. As discussed above with reference to FIG. 12, a winch (not shown) can be mounted to the suspension beam or suspension frame member 594 for winching a malfunctioned robotic load handling device from the tracks and/or up righting a toppled robotic load handling device on the tracks. As discussed above, a hook (not shown) or other suitable fastener can be attached to the free end of a winch cable for engaging with the hoist element of the load handling device. A stretcher (not shown) can be attached to the winch to assist with the safe removal of the injured person from the grid structure. The winch can be manually driven or motorised so giving the operative restrained to the frame more control to safely winch the injured person from the tracks. The spacing between the first and second fall restraint apparatus can be an area for an operator to work on the tracks or the load handling device whilst being tethered to the suspension frame member, e.g. by an inertia reel.

In operation, one or more operators restrained to each of the first 560*a* and second 560*b* fall restraint apparatus are able to manoeuvre the assembly 500 by virtue of the rolling assembly 572*a*, 572*b* of the first and second fall restraint apparatus on the tracks. The weight of each of the first and second fall restraint apparatus is sufficient for an operator restraint to the respective first and second fall restraint apparatus to manoeuvre the assembly 500 on the tracks by lifting at least a portion of its wheel assembly clear of the tracks. Whilst the combined weight of the assembly is greater than 100 kg, the weight of each of the first and second fall restraint apparatus is less than 60 kg allowing the assembly to be manoeuvred easily on the tracks.

The second fall restraint apparatus 560*b* can trail behind the first fall restraint apparatus 560*a* when moving the assembly 500 on the tracks such that they move in tandem on the tracks. To steer the assembly on the tracks so as to position the suspension beam or the suspension frame member over a malfunctioned load handling device or an injured person on the tracks, an operator in one or both the first and second fall restraint apparatus can steer their respective fall restraint apparatus on the tracks. Having a pivotable joint connecting the suspension beam or suspension frame member to the first and second fall restraint apparatus allows the first and second fall restraint apparatus to move independently with respect to each other and thereby, providing an improved steering ability of the assembly on the tracks.

The fall restraint apparatuses 560*a*, 560*b* shown in FIG. 18 additionally comprise anti-topple mechanisms 506*a*, 506*b* in the form of tensioned cables or wires. These comprise a continuous stabilising surface which prevents the fall restraint apparatuses from falling into a grid opening. The first restraint apparatus 560*a* comprises two tensioned tethers 506*a*, and each tension tether is located at the lower portion 568*a* of the frame extending between the front wheel assembly 573*a* and the rear wheel assembly 573*b*. One end of each tension tether is attached to one end of the front wheel assembly 573*a*, and the other end of the tension tether is attached to an opposing end of the rear wheel assembly 573*b*. The second restraint apparatus 560*b* comprises two tensioned tethers 506*b*, and each tension tether is positioned in an identical way to the first restraint apparatus 560*a*. The tensioned tethers are positioned on the fall restraint apparatus, so that if the fall restraint apparatus becomes unbalanced, the tensioned tethers touches or rests on the grid members and avoid the fall restraint apparatus falling into a grid opening. In effect, the anti-topple mechanisms increase the footprint of the fall restraint apparatus, thereby making it more stable on the grid structure.

The tensioned tethers may be made of any material which is strong and can remain taut for long periods of time, for example, the tensioned tethers may comprise steel. Further, the tensioned tethers do not contribute significantly to the weight of the fall restraint apparatus, and so offer a further stability measure whilst still allowing an operative to physically lift the fall restraint apparatus into its desired position on the grid structure. Anti-topple mechanisms, such as the tensioned tethers shown in FIG. 18 may be used on any embodiment of the fall restraint apparatus.

Figure 19:
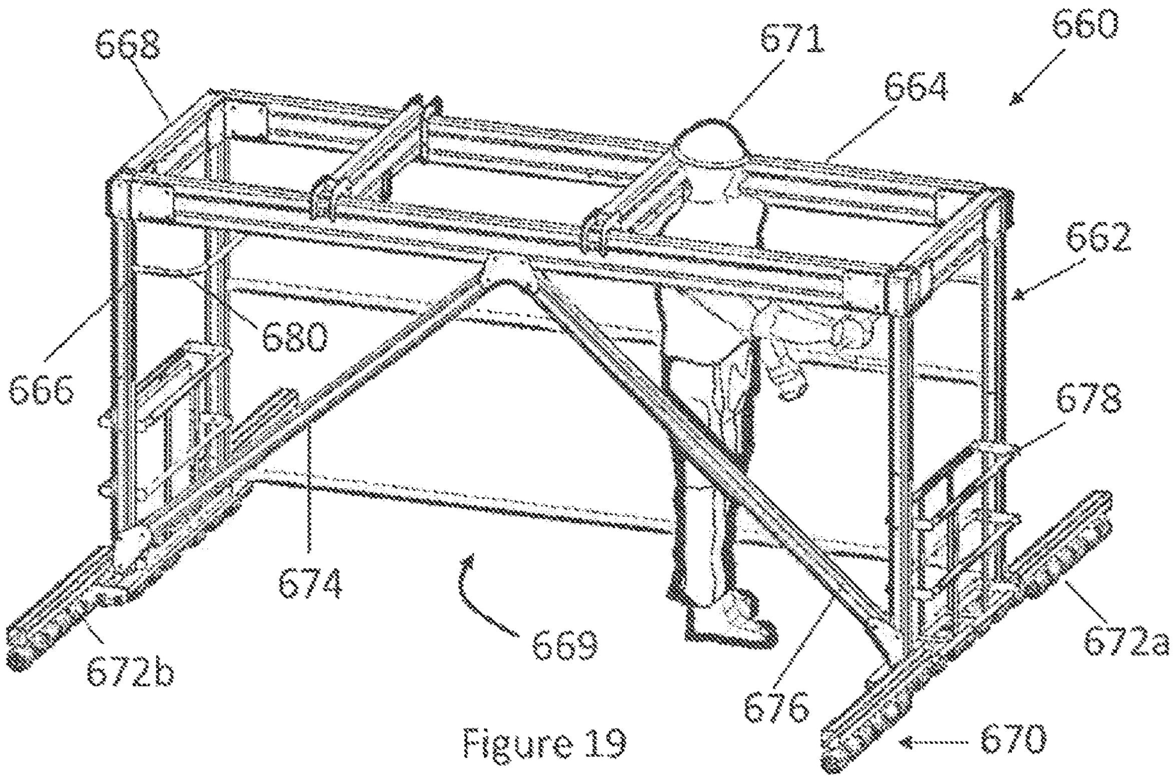
FIG. 19 is a schematic drawing of a fall restraint apparatus according to a fifth embodiment of the present invention.

In another embodiment shown in FIG. 19, the fall restraint apparatus 660 comprises a gantry 662 comprising a pair of horizontal beams 664 arranged in parallel and supported by one or more legs or vertical members 666 at the front and the rear of the gantry 662. The pair of horizontal beams 664 are spaced apart and held apart by a spacer 668 connected to the distal ends of the pair of horizontal beams 664. The spaced apart relationship between the pair of horizontal beams 664 supported by one or more legs 666 at the front and rear of the gantry 662 provides an open interior space or workspace 669 extending between the one or more legs 666 at the front and rear of the gantry. In comparison to other service vehicles operative on the grid structure known in the art, the workspace 669 defined by the pair of horizontal beams 664 and the one or more legs 666 at the front and rear of the gantry 662 provides an area for one or more operatives 671 restrained in the workspace 669 to have clear visibility of a malfunctioned robotic load handling device on the grid structure without the need to move the robotic load handling device to a position on the service vehicle in order to gain access to the malfunctioned robotic load handling device as found in prior art solutions. This allows the one or more operatives 671 restrained in the workspace 669 to carry out the necessary repairs to a malfunctioned robotic load handling device whilst on the grid structure without the need to carry the malfunctioned robotic load handling device to the edge or periphery of the grid structure. In comparison to the embodiments of the fall restraint apparatus shown in FIGS. 6, 16 and 17, the fall restraint apparatus shown in the embodiment shown in FIGS. 19 to 23 does not necessarily need to be lightweight in the sense of weighing less than 100 kg, preferably less than 60 kg. As the workspace 669 in the embodiment shown in FIG. 19 is able to accommodate more than one operative, the weight of the fall restraint apparatus is not necessarily a determining factor when manoeuvring the fall restraint apparatus on the grid structure. However, to reduce the weight of the fall restraint apparatus, the components of the gantry and plurality of legs can be formed from tubular members, e.g. lightweight aluminium tubular members.

Having the space within the fall restraint apparatus to work on a malfunctioned robotic load handling device allows the operative to work on the malfunctioned robotic load handling device at the point of breakdown. In a majority of cases, the repair of the malfunctioned robotic load handling device is generally a simple fix and having the ability to work on the malfunctioned robotic load handling device at the point of breakdown reduces the downtime the robotic load handling device is inoperable on the grid structure.

A pair of legs 666 at the front and the rear of the gantry 662 support the parallel horizontal beams 664 and are spaced apart having the same spacing as the pair of horizontal beams above. The legs 666 are braced at one or both sides of the gantry so as to enclose the workspace 669. One of the pair of legs at the front and rear of the gantry are braced together by one or more bracing members 674, 676. In the particular embodiment of the present invention shown in FIG. 19, diagonal bracing members 674, 676 connect one of the pair of legs 666 at the front and rear of the gantry to one of the pair of horizontal beams 664 at one side of the gantry in a K-brace but other patterns of the bracing members are applicable in the present invention including but is not limited to a cross brace. The spacing between the pair of legs at the front and rear of the gantry is sized to accommodate one or more pockets 678 to allow an operative restrained within the workspace to store tools and/or replacement parts in the one or more pockets 678. Alternatively, the spacing between the pair of legs at the front and rear of the gantry may accommodate one or more panniers to store tools and/or replacement parts. One or more handles or bars 680 (see FIG. 20) extend across the pair of legs 666 at the front and/or rear of the gantry so as to enable an operative restrained within the workspace to hold onto the handle whilst walking on the grid structure (see FIG. 19).

Also shown in FIG. 19 is one or more bridging members 682 extending across the workspace and supported by the pair of horizontal beams 664. As with the other embodiments of the present invention discussed above, a winch (not shown) can be mounted to the bridging member 682 for winching a load from the grid structure. For example, the winch mounted to the bridging member can be used to upright an overturned robotic load handling device or lift a malfunctioned robotic load handling device clear of the tracks so as enable the robotic load handling device to be carried to the edge or periphery of the grid structure. In the particular embodiment shown in FIG. 20, the bridging member 682 is mounted on a pair of rails or tracks 684 supported by the pair of horizontal beams 664. The pair of rails 684 can be fixed to the pair of horizontal rails or integrally formed with the pair of horizontal beams 664. This permits the bridging member 682 to be moveable along the length of the pair of horizontal beams 664 and allows the bridging member 682 to be accurately positioned over a malfunctioned robotic load handling device rather than the need to move the fall restraint apparatus when trying to position the winch over the malfunctioned robotic load handling device.

To manoeuvre the fall restraint apparatus 660 on the grid structure, the gantry 662 is mounted on a rolling assembly 670 as discussed above with reference to FIGS. 8 and 9. As discussed above, the rolling assembly can be a freewheeling rolling assembly so as to enable an operative restrained with the workspace to manually move the fall restraint apparatus on the grid structure. The rolling assembly comprises a front wheel assembly and a rear wheel assembly, each wheel assembly of the front and rear wheel assembly extends laterally and outwardly either side of the gantry such that each wheel assembly of the front wheel assembly and the rear wheel assembly contacts different tracks of the grid structure. Here, the length, Lw, of each wheel assembly 672*a*, 672*b* of the front and rear wheel assembly extends across a grid opening 14*c* so that the wheel assembly contacts different tracks or areas of the grid structure (at least two contact points) when travelling on the grid structure to prevent any portion of the rolling assembly falling into a grid cell opening. In the particular embodiment shown in FIG. 19, each wheel assembly 672*a*, 672*b* of the front and rear wheel assembly comprises three sets of wheels rotatable about a respective common axis. Like the first embodiment of the fall restraint apparatus, the front and rear wheel assembly 672*a*, 672*b* extends transversely to the longitudinal direction of the pair of horizontal beams 664 such that each wheel assembly 672*a*, 672*b* of the front and rear wheel assembly extends laterally and outwardly either side of the gantry 662. The outwardly extending wheel assembly provides increased stability of the fall restraint apparatus 660 so that an operative 671 restrained within the workspace 669 is able to move the fall restraint apparatus in the longitudinal direction when walking on the grid structure. Similarly to the other embodiments, the wheel assembly at the front and rear of the gantry is freewheeling in the sense that they are freely rotating.

Figure 20:
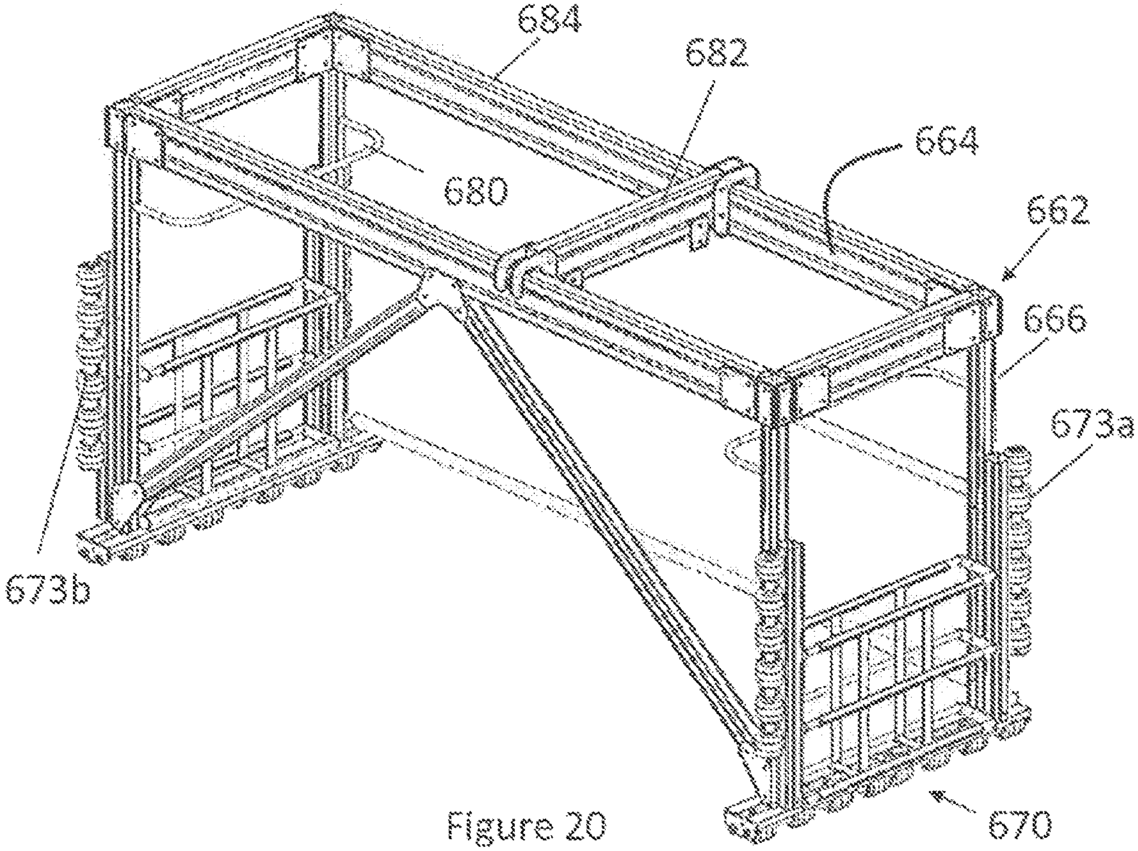
FIG. 20 is a schematic drawing of the fall restraint apparatus of FIG. 19 showing the rolling assembly in a stowed configuration.
Figure 21:
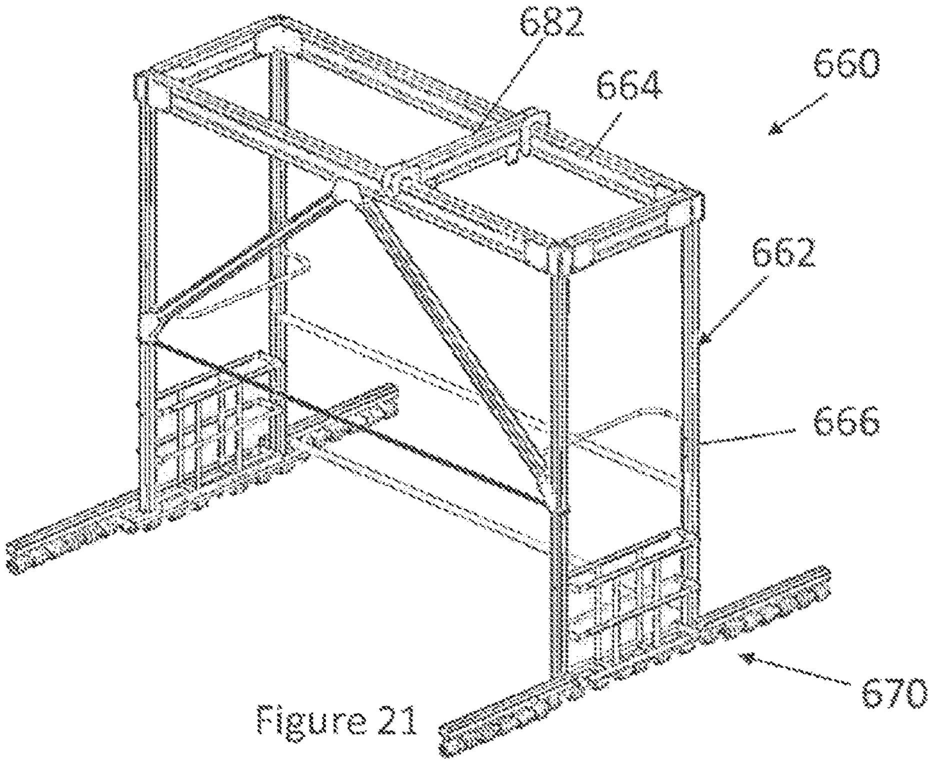
FIG. 21 is a schematic drawing of a fall restraint apparatus with a different height to the one shown in FIG. 19.

As the front and rear wheel assembly 672*a*, 672*b* extends outwardly either side of the gantry across multiple grid cells, at least a portion 673*a*, 673*b* of the front and rear wheel assembly are collapsible in the sense that they can be stowed away so reducing the footprint of the fall restraint apparatus for the purpose of storage of the fall restraint apparatus or freeing up grid cells occupied by anyone of the front and rear wheel assembly 672*a*, 672*b*. In the particular embodiment shown in FIG. 20, one or more sets of wheels of the front and rear wheel assembly 673*a*, 673*b* are pivotally mounted to one of the legs supporting the pair of parallel horizontal beams 664 at the front and rear of the gantry 662. The one or more sets of wheels of the front and rear wheel assembly 673*a*, 673*b* are mounted on a carrier that is engageable with one of the legs 666 supporting the pair of parallel horizontal beams 664 at the front and rear of the gantry 662. In the stowed configuration, two 673*a*, 673*b* out of the three sets of wheels at the front and rear of the gantry extending laterally either side of the gantry are rotated so as to be lifted clear of the ground (in this case tracks) and secured to one of the legs supporting the pair of parallel horizontal beams at the front and rear of the gantry. When deploying the stowed wheels, the two sets of wheels 673*a*, 673*b* at the front and rear of the gantry are disengaged from the legs of the gantry and are rotated so that they contact the tracks. FIG. 20 shows the wheel assembly at the front and rear of the gantry in a stowed configuration and FIG. 19 shows the wheel assembly at the front and rear of the gantry in a deployed configuration having wheels extending laterally either side of the gantry.

The height of the pair of horizontal beams 664 above the rolling assembly 670 can be varied by mounting the pair of horizontal beams 664 to different lengths of legs. In the particular embodiment shown in FIG. 21, the height of the gantry 662 is increased by mounting the pair of parallel horizontal beams 664 to longer legs 666. Alternatively, one or more legs at the front and rear of the gantry can be telescopic so as to enable the height of the gantry to be varied. The advantage of increasing the height of the gantry is that it allows the height of the workspace to be increased providing sufficient headroom for an operative 671 restrained within the workspace 669 as demonstrated in FIG. 22. Restraining an operative within the workspace of the gantry can involve an operative wearing a suitable harness attached to any portion of the gantry, e.g. horizontal beams or legs, via one or more fasteners (not shown) as discussed above with respect to the other embodiments of the present invention. The one or more fasteners can comprise an inertia reel.

Figure 22:
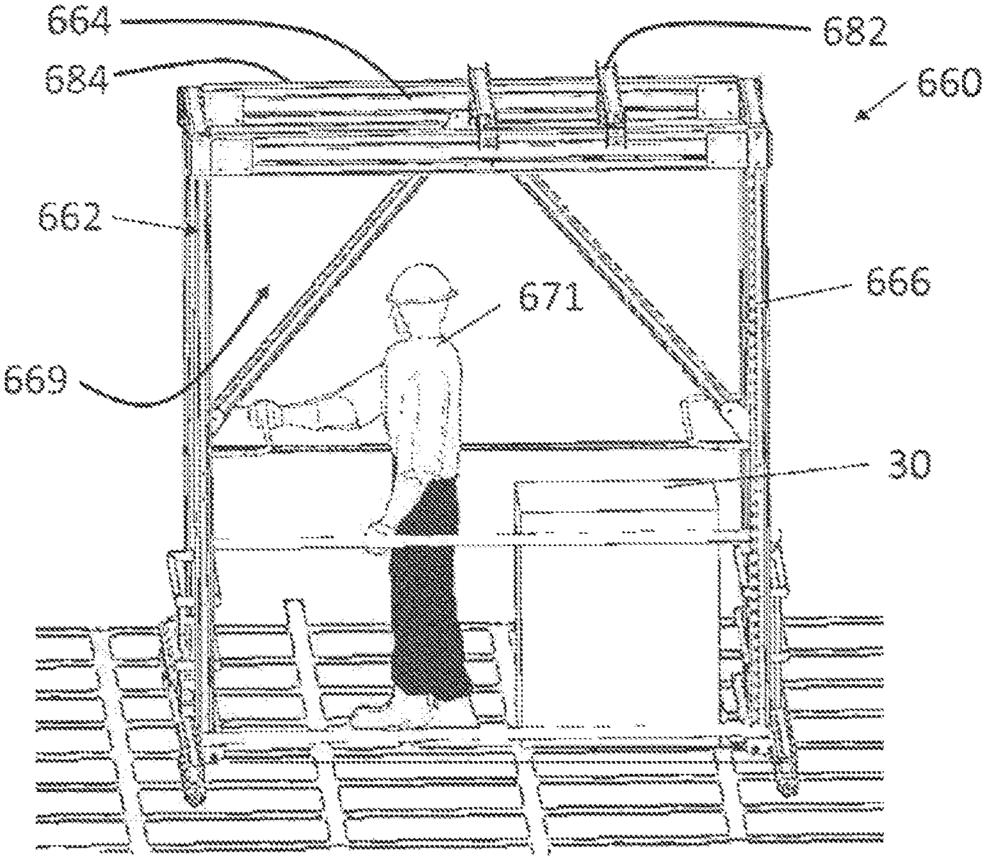
FIG. 22 is a schematic drawing of the fall restraint apparatus shown in FIG. 21 on a grid structure.

In operation, when referring to FIG. 22, an operative 671 restrained within the workspace 669 of the gantry 662 is able to push the fall restraint apparatus 660 on the tracks in the direction of a malfunctioned robotic load handling device and manoeuvre the fall restraint apparatus such that the malfunctioned robotic load handling device is within the workspace of the gantry. Once in the workspace, the operative can move the bridging member 682 along the rails 684 so as to position it directly above the robotic load handling device 30 so as to enable a winch mounted to the bridging member 682 to engage with the robotic load handling device, more specifically to the hoist element of the robotic load handling device (see FIG. 13). The winch can be used to upright an overturned robotic load handling device on the tracks or carry a malfunctioned robotic load handling device to a place of safety away from the 'live' grid structure so as to prevent operational robotic load handling devices from crashing into the malfunctioned robotic load handling device—this is usually at the edge of the grid structure.

Figure 23:
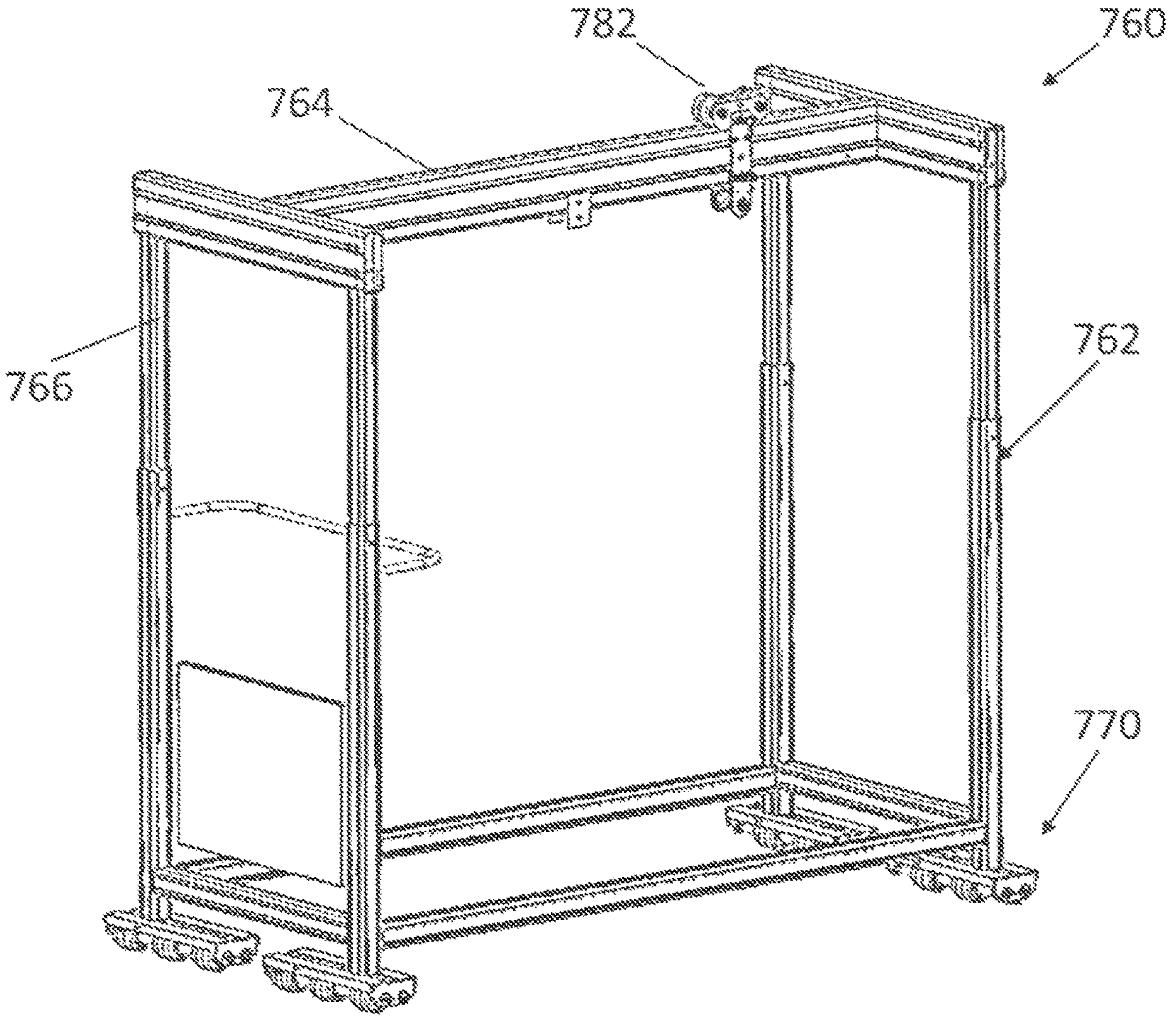
FIG. 23 is a schematic drawing of an adaption of the fall restraint apparatus shown in FIG. 21 with a single suspension beam according to a sixth embodiment of the present invention.

FIG. 23 shows a slight modification of the fall restraint apparatus shown in FIGS. 19 to 22, wherein the fall restraint apparatus 760 comprises a single suspension beam or horizontal beam 764 extends between the one or more legs 766 at the front and rear of the gantry 762 and a moveable trolley 782 carrying a winch is mounted to the single suspension beam 764. In contrast to the bridging member shown in FIGS. 19 to 22 where the load is distributed over the pair of parallel horizontal beams, the load in the embodiment shown in FIG. 23 is borne by the single suspension beam 764. The other features of the fall restraint apparatus shown in FIG. 23 are the same as in the embodiment shown in FIGS. 19 to 22.

Figure 24:
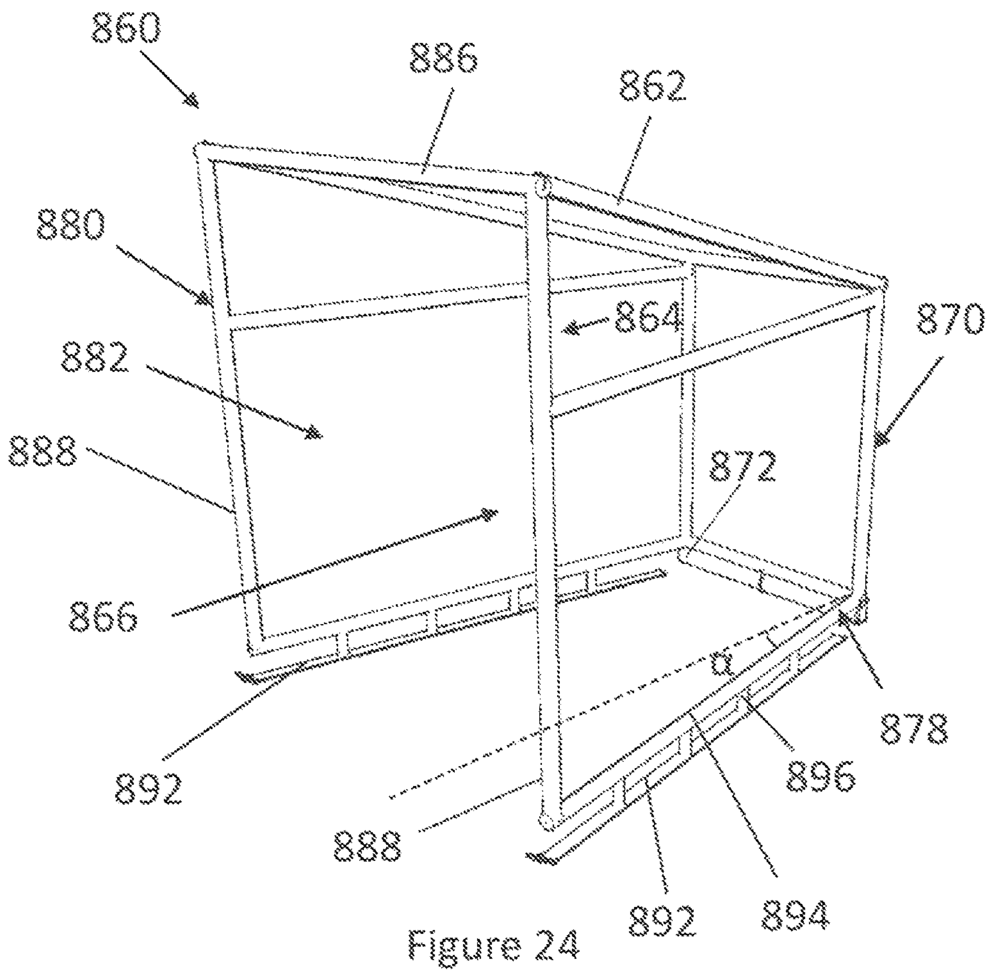
FIG. 24 is a schematic drawing of a fall restraint apparatus according to a sixth embodiment of the present invention.

In another embodiment, shown in FIG. 24, the fall restraint apparatus 860 comprises a wedge-shaped frame structure. Specifically, the frame 862 comprises a front end 870 and an opposing rear end 880, and the rear end 880 is wider than the front end 870. The rear end 880 of the frame is also taller than the front end 870. Further, the rear end 880 provides an opening 882 into the open interior space 866. The opening 882 allows an operative, positioned in the open interior structure 866, to take longer, more natural strides when moving around the grid structure and the rear end 880 is positioned in front of the operative. Further, the opening 882 allows an operative to more easily access a part of the grid structure and carry out repair work. The opening 882 also is configured to receive a further fall restraint apparatus. Multiple fall restraint apparatuses can be nested together by pushing the front end of a second fall restraint apparatus into the opening at the rear end of the first fall restraint apparatus. This allows multiple fall restraint apparatuses to be stored in a small area.

Figure 25:
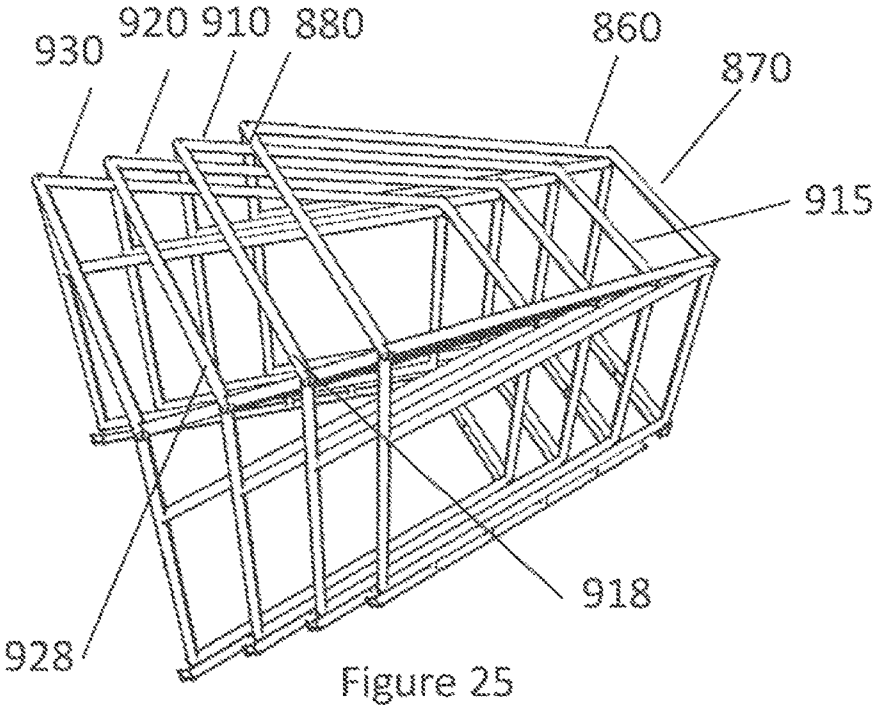
FIG. 25 is a schematic drawing of a plurality of the fall restraint apparatuses of FIG. 24 nested within each other.

FIG. 25 shows four fall restraint apparatuses, each having the wedge-shaped frame of FIG. 24, nested within each other. The first fall restraint apparatus 860 is at the front of the nest, and a front end 915 of a second fall restraint apparatus 910 is pushed into the opening in the rear end 880 of the first fall restraint apparatus 860 so that the front end 915 of the second fall restraint apparatus 910 is positioned in the interior open space 866 close to the front end 870 of the first fall restraint apparatus 860. The wedge-shaped frame means that the frame converges towards the front end. Thus, the front ends 870 of the frames 886 are both narrower and shorter than the rear end 880 of the frames. The third 920 and fourth fall restraint apparatus 930 have identical shaped frames to the first 860 and second fall restraint apparatus 910 such that the third fall restraint apparatus 920 can be pushed into the opening in the rear end 918 of the second fall restraint apparatus 910 and the fourth fall restraint apparatus 930 can be pushed into the opening in the rear end 928 of the third fall restraint apparatus. In this way, the first 860, second 910, third 920, and fourth fall restraint apparatus 930 can be manoeuvred as a set of fall restraint apparatuses. Further fall restraint apparatuses can be added to the set of fall restraint apparatuses shown in FIG. 25. Other shapes of frame having a rear end that is wider than the front end may also be used, for example, the frame may be L-shaped.

As shown in FIG. 24, the opening 882 at the rear end 880 of the frame is defined by a pair of vertical members 888 spaced apart and held apart by a spacer 886 connected to the distal ends of the pair of vertical members 888. The spacer 886 defines the top of the opening 882, whilst the pair of vertical members 888 define the sides of the opening 882. The bottom of the opening 882 is defined by the grid structure, when located on the grid, or the ground if located off the grid. Thus, the fall restraint apparatus 860 does not comprise a rear wheel assembly as present in other embodiments. The dimensions of the opening 882 are such that the front end of the frame of another fall restraint apparatus can fit into the opening 882 and nest within the open interior structure 866 of the fall restraint apparatus.

Like the other embodiments of the present invention, the frame 862 comprises an upper portion 864 for restraining the at least one operative to the frame 862 and a lower portion 878 for mounting the rolling assembly 872. The frame is configured such that the operative is positioned within the open interior structure 866. The upper portion 864 has a triangular shape when viewed side-on such that parallel side frame members define a handle that slopes downwardly. The lower portion 878 is rectangular in shape when viewed side-on. The front end 870 is narrower and shorter than the rear end 880. In FIG. 24, the front end 870 is approximately two-thirds the height and width of the rear end 880. Other ratios between the height and width of the front end to the rear end are also possible. The operative may move across the grid structure with the rear end 880 of the frame in front of them. Alternatively, the operative may move across the grid structure with the front end 870 in front of them to avoid having their sight blocked by the spacer 886 at the rear end 880 of the frame.

The fall restraint apparatus 860 is moveable by a rolling assembly 872 at the front end 870 of the frame. The rolling assembly 872 is mounted to the lower portion 878 of the frame. To steer the fall restraint apparatus, the operative pivots or tilts the frame around the rolling assembly 872. For example, to manoeuvre the fall restraint apparatus on the grid structure, an operative lifts the rear end 880 of the frame and pivots the fall restraint apparatus about a vertical axis extending through the rolling assembly 872. Thus, an operative moves the fall restraint apparatus in a similar way to moving a wheelbarrow. The width of the front rolling assembly is such that the operative is able to tilt the fall restraint apparatus on its rolling assembly, for example the rolling assembly may be wider than twice the diagonal length across a grid opening. FIG. 24 illustrates that the rolling assembly 872 comprises two rollers. However, the rolling assembly 872 may comprise any number of rollers, for example one roller, three rollers, or four rollers. Using more rollers makes it easier to steer the fall restraint apparatus. Alternatively, the rolling assembly 872 comprises wheels. The rolling assembly 872 is freewheeling in the sense that the rollers or wheels are freely rotating. Alternatively, the fall restraint apparatus does not comprise any rollers and instead comprises a skate at the front end 870 of the frame, similar to and in addition to a pair of skates 892 extending longitudinally along the length of the frame, as shown in FIG. 24 and now discussed.

The fall restraint apparatus of FIG. 24 comprises a sliding assembly 892, in the form of a pair of skates, which is arranged to slide over the grid structure with minimal friction. The sliding assembly also increases contact with the grid thereby increasing the stability of the fall restraint apparatus on the grid structure. The pair of skates are attached to the underside of horizontal beams 894 in the lower portion 878 of the fall restraint apparatus. Each skate at each side of the frame diverges outwardly from the front end 870 towards the rear end 880 by an acute angle $\alpha$ so as to provide increased stability of the fall restraint apparatus 860 on the grid structure. The pair of skates 892 are wider than the width of the horizontal beams 894, thereby increasing contact with the grid members and thereby increasing the stability of the fall restraint apparatus. Additionally, but not shown, the pair of skates have rounded edges on all four sides to allow the frame to be moved in all directions. The skates may be attached directly to the underside of the horizontal beams 894, or as shown in FIG. 24, the pair of skates 892 may be attached to the underside of the horizontal beams 894 by connector beams 896. Overall, the operative can move and steer the fall restraint apparatus using a combination of both the rolling assembly 872 (or alternatively a skate at the front end 870 of the frame) and the pair of skates 892 extending longitudinally along the length of the frame.

Whilst not shown in FIG. 24, the fall restraint apparatus 860 may comprise an additional beam positioned laterally parallel to the spacer 886 but at a lower height than the spacer in the upper portion 864 of the frame onto which a hoist or hook may be attached. The hoist or hook can be used for lifting a toppled load handling device 30 on the grid structure. In this configuration, the load handling device can be lifted from the grid structure into the interior open structure 866 without destabilising the fall restraint apparatus 866. Alternatively, two fall restraint apparatuses of the present embodiment may be linked together by a suspension beam 594 or suspension frame member, such as the one shown in FIG. 18, for suspending a malfunctioned robotic load handling device above the tracks.

Various modifications of the illustrative embodiments which are apparent to the person skilled in the art within the scope of the present invention as defined in the claims are deemed to fall within the scope of the present invention. For example, different rolling assemblies can be used without departing from the scope of the present invention as defined in the claims. For example, different combinations of wheels and/or rollers can be used for the rolling assembly. These include but is not limited to an elongated rollers to a plurality of wheels rotatable about a common rotation axis.

Further Features of the embodiment shown in FIGS. 19 to 23 include:

1. A fall restraint apparatus for manually moving on a grid structure comprising a first set of parallel tracks and a second set of parallel tracks running transversely to the first set in a substantially horizontal plane and arranged in a grid pattern comprising a plurality of grid cells, each grid cell having a length in the range 600-800 mm and a width in the range 400-600 mm so defining a grid opening defined by a pair of adjacent tracks of the first set of parallel tracks and a pair of adjacent tracks of the second set of parallel tracks; the fall restraint apparatus comprising:
   - a gantry comprising at least one horizontal beam supported at each end by a plurality of legs to define a workspace for one or more operatives to be restrained within the workspace;
   - the gantry is mounted on a rolling assembly so as to enable the user restrained in the workspace to manually move the fall restrain apparatus in any direction on the grid structure, the rolling assembly comprises a front wheel assembly and a rear wheel assembly, each wheel assembly of the front and rear wheel assembly extends laterally and outwardly either side of the at least one horizontal beam such that each wheel assembly of the front wheel assembly and the rear wheel assembly contacts different tracks of the grid structure.

2. The fall restraint apparatus of feature 1, wherein the plurality of legs at each end of the at least one horizontal beam is provided with the front and rear wheel assembly respectively.

3. The fall restraint apparatus of feature 1 or 2, wherein the plurality of legs at each end of the at least one horizontal beam comprises a pair of legs.

4. The fall restraint apparatus of feature 3, wherein the pair of legs at each end of the at least one horizontal beam are parallel or upwardly converging.

5. The fall restraint apparatus of feature 3 or 4, further comprising a pocket secured between the pair of legs at one or both ends of the at least one horizontal beam.

6. The fall restraint apparatus of any of the features 3 to 5, further comprising at least one handle within the workspace, said at least one handle extending between the pair of legs at the front and/or rear of the gantry.

7. The fall restraint apparatus of any of the preceding features, wherein at least a portion of the front and rear wheel assembly are pivotally mounted to at least one leg of the plurality of legs at each end of the at least one horizontal beam such that the at least portion of the front and rear wheel assembly are rotatable from a stowed configuration where the at least portion of the front and rear wheel assembly is lifted clear of the tracks to a deployed configuration where the at least portion of the front and wheel assembly engages with the tracks.

8. The fall restraint apparatus of feature 7, wherein the at least portion of each of the front and rear wheel assembly are mounted on a carrier that is engageable with the at least one leg of the plurality of legs at each end of the at least one horizontal beam so as to be secured to the at least one leg of the plurality of legs in the stowed configuration.

9. The fall restraint apparatus of any of the preceding features, wherein the at least portion of the front and rear wheel assembly comprises a pair of sets of wheels laterally disposed either side of the at least one horizontal beam such that the length of the front and rear wheel assembly is greater than the length corresponding to the diagonal length across a grid opening.

10. The fall restraint apparatus of feature 9, wherein each of the front and rear wheel assembly comprises three set of wheels.

11. The fall restraint apparatus of feature 10, wherein each of the three sets of wheels comprises a plurality of wheels arranged to be rotatable about a common axis.

12. The fall restraint apparatus of any of the preceding features, wherein the front wheel assembly is separated from the rear wheel assembly by a wheelbase having a length greater than the length across at least one grid cell.

13. The fall restraint apparatus of any of the preceding features, further comprising a winch moveably mounted to the at least one horizontal beam.

14. The fall restraint apparatus of the preceding features, wherein the at least one horizontal beam comprises a pair of horizontal parallel beams such that the pair of horizontal beams is supported at each end by the plurality of legs.

15. The fall restraint apparatus of feature 14, further comprising at least one bridging member supported by the pair of horizontal parallel beams such that the bridging member extends across the workspace.

16. The fall restraint apparatus of feature 15, wherein the at least one bridging member is moveable along the longitudinal length of the pair of horizontal parallel beams.

17. The fall restraint apparatus of feature 16, wherein the at least one bridging member is mounted on a pair of rails or track so as to be moveable along the longitudinal length of the pair of horizontal parallel beams.

18. The fall restraint apparatus of any of the preceding features, wherein each of the plurality of legs at each end of the at least one horizontal beam is extendible so as to raise the at least one horizontal beam relative to the rolling assembly.

19. The fall restraint apparatus of any of the preceding features, further comprising one or more bracing members extending between one of the one or more of the legs at the front and rear of the gantry so as to enclose the workspace from at least one side of the gantry.

20. The fall restraint apparatus of feature 19, wherein the one or more bracing members comprises first and second bracing members, the first and second bracing members are arranged to connect one of the parallel support beams to one of the one or more legs at the front and rear of the gantry in a K-brace.

The invention claimed is:

1. A fall restraint apparatus for manually moving on a grid structure including a first set of parallel tracks and a second set of parallel tracks running transversely to the first set in a substantially horizontal plane and arranged in a grid pattern including a plurality of grid cells, each grid cell having a length in a range 600-800 mm and a width in a range 400-600 mm so defining a grid opening defined by a pair of adjacent tracks of the first set of parallel tracks and a pair of adjacent tracks of the second set of parallel tracks; the fall restraint apparatus comprising:

a frame having a weight less than 100 kg and an upper portion and a lower portion, the upper portion being configured for restraining at least one operative; and a moving assembly mounted to the lower portion of the frame, the moving assembly being configured for moving the frame on the grid structure, said moving assembly includes a rolling assembly;

a front wheel assembly and a rear wheel assembly, each of the front wheel assembly and the rear wheel assembly extends across the at least one grid cell such that each of the front wheel assembly and the rear wheel assembly will contact different tracks of the grid structure and the fall restraint apparatus will be operative to move in any direction on the grid structure.

2. The fall restraint apparatus of claim 1, wherein the wheel assembly of the front wheel assembly and/or the rear wheel assembly comprises:

at least one elongated roller.

3. The fall restraint apparatus of claim 1, wherein each wheel assembly of the front wheel assembly and rear wheel assembly comprises:

a plurality of wheels, the plurality of wheels being configured and arranged so as to be rotatable about a common axis; and optionally, wherein each wheel of the plurality of wheels is separated by a distance less than a width of a track of the first and the second set of tracks.

4. The fall restraint apparatus of claim 3, wherein each wheel of the plurality of wheels is separated by a distance less than a width of a track of the first and the second set of tracks.

5. The fall restraint apparatus of claim 1, wherein the front wheel assembly is separated from the rear wheel assembly by a wheelbase having a length greater than the length across at least one grid cell.

6. The fall restraint apparatus of claim 1, wherein the plurality of wheels are mounted to at least one shaft.

7. The fall restraint apparatus of claim 1, wherein the rolling assembly extends outwardly of the upper portion.

8. The fall restraint apparatus of claim 1, wherein the at least one wheel assembly of the front wheel assembly and the at least one wheel assembly of the rear wheel assembly extends transversely to the longitudinal direction of the upper portion.

9. The fall restraint apparatus of claim 8, wherein the frame comprises:

an assembly of frame members arranged to form an interior open structure for accommodating at least one operative wherein the at least one operative restrained by the upper portion is configured to, in operation, manually walk on the grid structure within the open interior space.

10. The fall restraint apparatus of claim 9, wherein the upper portion includes a pair of parallel side frame members, the parallel side frame members being connected together by at least one end frame member substantially perpendicular to the parallel side frame members to define a handle, the handle being supported above the rolling assembly by a plurality of supports such that at least one operative will manually hold onto the handle when walking on the grid structure.

11. The fall restraint apparatus of claim 9, wherein the upper portion of the frame includes a suspension frame member or suspension beam extending across the pair of parallel side frame members for supporting at least one operative.

12. The fall restraint apparatus of claim 1, wherein the lower portion of the frame comprises:

a sub-frame for supporting the moving assembly.

13. The fall restraint apparatus of claim 1, wherein the upper portion of the frame comprises:

A-frames, and a suspension frame member extending between the A-frames for supporting at least one operative.

14. The fall restraint apparatus of claim 1, wherein the frame comprises:

a tow member configured for coupling or interfacing with a load handling device on the grid structure.

15. The fall restraint apparatus of claim 1, wherein the frame comprises:

one or more anti-topple mechanisms on either side of the frame configured for preventing toppling of the fall restraint apparatus on the grid structure, the one or more anti-topple mechanisms including a continuous stabilising surface extending between the front and rear wheel assemblies.

16. The fall restraint apparatus of claim 15, the frame comprising:

a front end and an opposing rear end, the opposing rear end being wider than the front end and configured to allow a second fall restraint apparatus to be nested within the fall restraint apparatus.

17. The fall restraint apparatus of claim 1, wherein a length of each of the front wheel assembly and the rear wheel assembly is greater than a length corresponding to a diagonal length across a grid opening.

18. An assembly comprising:

i) a first fall restraint apparatus:

ii) a second fall restraint apparatus each of the first and second fall restraint apparatus including the fall restraint apparatus of claim 1; and iii) a suspension beam or suspension frame member joining the first and second fall restraint apparatus together.

19. The assembly of claim 18, wherein the suspension beam or suspension frame member is mounted to the upper portion of the frame of each of the first and second fall restraint apparatus.

20. The assembly of claim 18, wherein a winch is mounted to the suspension beam or the suspension frame member.

* * * * *